United States Patent
Kim et al.

(10) Patent No.: US 12,550,138 B2
(45) Date of Patent: Feb. 10, 2026

(54) METHOD AND APPARATUS FOR TRANSMITTING AND RECEIVING UPLINK CHANNEL IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 451 days.

(21) Appl. No.: 18/012,389

(22) PCT Filed: Jun. 25, 2021

(86) PCT No.: PCT/KR2021/008001
§ 371 (c)(1),
(2) Date: Dec. 22, 2022

(87) PCT Pub. No.: WO2022/005114
PCT Pub. Date: Jan. 6, 2022

(65) Prior Publication Data
US 2023/0309089 A1    Sep. 28, 2023

(30) Foreign Application Priority Data
Jun. 30, 2020    (KR) .................. 10-2020-0080620

(51) Int. Cl.
*H04W 72/1268*    (2023.01)
*H04B 7/06*    (2006.01)
*H04W 72/232*    (2023.01)

(52) U.S. Cl.
CPC ...... *H04W 72/1268* (2013.01); *H04B 7/0639* (2013.01); *H04W 72/232* (2023.01)

(58) Field of Classification Search
CPC ............ H04W 72/1268; H04W 72/232; H04B 7/0639; H04B 7/0404; H04B 7/0486;
(Continued)

(56) References Cited

U.S. PATENT DOCUMENTS

2018/0368083 A1*   12/2018   Yang ................. H04B 7/0486
2019/0281588 A1*   9/2019    Zhang ................ H04W 52/08
(Continued)

FOREIGN PATENT DOCUMENTS

WO   2018208087   11/2018
WO   2019203619   10/2019

OTHER PUBLICATIONS

PCT International Application No. PCT/KR2021/008001, International Search Report dated Oct. 13, 2021, 4 pages.

*Primary Examiner* — Kiet Tang
(74) *Attorney, Agent, or Firm* — LEE, HONG, DEGERMAN, KANG & WAIMEY

(57) ABSTRACT

A method and apparatus for transmitting and receiving an uplink channel in a wireless communication system are disclosed. A method for transmitting a physical uplink shared channel (PUSCH) according to one embodiment of the present disclosure may comprise steps of: receiving downlink control information (DCI) for PUSCH scheduling from a base station; and transmitting the PUSCH to the base station on the basis of a transmission precoding matrix indicator (TPMI) and a transmission rank given by the DCI.

11 Claims, 11 Drawing Sheets

(58) Field of Classification Search
CPC ........ H04B 7/024; H04B 7/0456; H04B 7/06; H04L 5/0044; H04L 5/0023; H04L 5/0053
See application file for complete search history.

(56) References Cited

U.S. PATENT DOCUMENTS

| | | |
|---|---|---|
| 2020/0106559 A1 | 4/2020 | Vilaipornsawai |
| 2020/0107353 A1 | 4/2020 | Jung et al. |
| 2020/0127786 A1* | 4/2020 | Kwak .................. H04L 5/0026 |
| 2022/0330258 A1* | 10/2022 | Xiao .................... H04L 5/0057 |

* cited by examiner

METHOD AND APPARATUS FOR TRANSMITTING AND RECEIVING UPLINK CHANNEL IN WIRELESS COMMUNICATION SYSTEM

CROSS-REFERENCE TO RELATED APPLICATION(S)

This application is the National Stage filing under 35 U.S.C. 371 of International Application No. PCT/KR2021/008001, filed on Jun. 25, 2021, which claims the benefit of earlier filing date and right of priority to Korean Application No. 10-2020-0080620, filed on Jun. 30, 2020, the contents of which are all incorporated by reference herein in their entirety.

TECHNICAL FIELD

The present disclosure relates to a wireless communication system, and in more detail, relates to a method and an apparatus of transmitting and receiving an uplink data/control channel in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of transmitting and receiving an uplink control/data channel in a wireless communication system supporting multiple multi-transmission reception points (TRPs).

A technical object of the present disclosure is to provide a method and an apparatus of determining a rank/precoder of an uplink control/data channel transmitted to each TRP in a wireless communication system supporting multiple multi-transmission reception points (TRPs).

A technical object of the present disclosure is to provide a method and an apparatus of determining transmit power of an uplink control/data channel transmitted to each TRP in a wireless communication system supporting multiple multi-transmission reception points (TRPs).

The technical objects to be achieved by the present disclosure are not limited to the above-described technical objects, and other technical objects which are not described herein will be clearly understood by those skilled in the pertinent art from the following description.

A method of transmitting a physical uplink shared channel (PUSCH) in a wireless communication system according to an aspect of the present disclosure may include: receiving, from a base station, downlink control information (DCI) for scheduling a PUSCH; and transmitting, to the base station, the PUSCH based on a transmission precoding matrix indicator (TPMI) and a transmission rank given by the DCI. The PUSCH may be transmitted in a plurality of transmission occasions (TO), the plurality of TOs may be configured with N (N is a natural number) TO groups including one or more TOs, the PUSCH may be transmitted based on a precoding vector group associated with a TO group in which the PUSCH is transmitted, the precoding vector group may be determined as one or more precoding vectors constituting a precoding matrix indicated by the TPMI.

A method of receiving a physical uplink shared channel (PUSCH) in a wireless communication system according to an aspect of the present disclosure may include: transmitting, to a terminal, downlink control information (DCI) for scheduling a PUSCH; and receiving, from the terminal, the PUSCH based on a transmission precoding matrix indicator (TPMI) and a transmission rank given by the DCI. The PUSCH may be transmitted in a plurality of transmission occasions (TO), the plurality of TOs may be configured with N (N is a natural number) TO groups including one or more TOs, the PUSCH may be transmitted based on a precoding vector group associated with a TO group in which the PUSCH is transmitted, the precoding vector group may be determined as one or more precoding vectors constituting a precoding matrix indicated by the TPMI.

According to an embodiment of the present disclosure, reliability of an uplink channel can be increased by applying a rank/precoder suitable for an uplink channel condition of each TRP in a wireless communication system supporting transmission and reception of multiple transmission reception points (TRPs).

According to an embodiment of the present disclosure, waste of power of an antenna port for an uplink channel may be reduced in a wireless communication system supporting multi-transmission reception point (TRP) transmission and reception.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
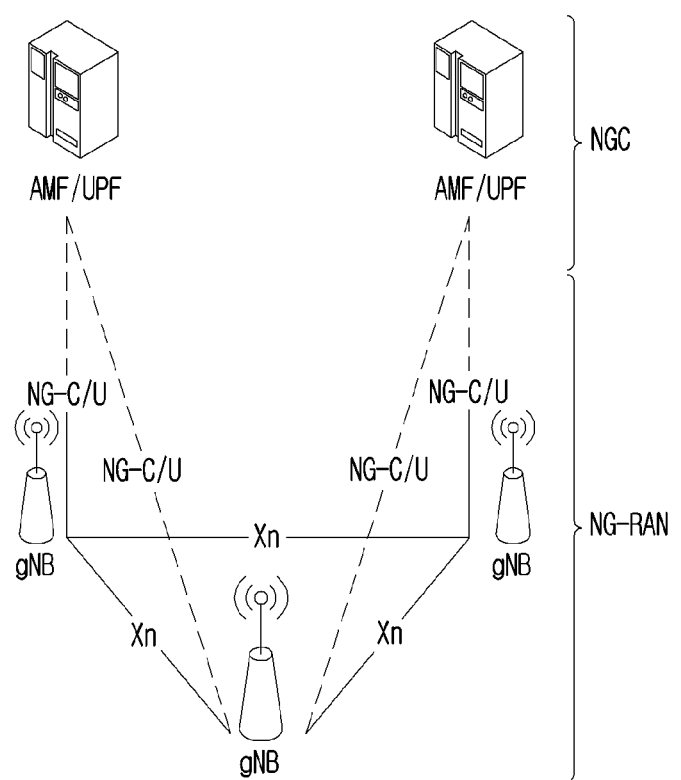
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB(evolved-NodeB), a gNB(Next Generation NodeB), a BTS(base transceiver system), an Access Point(AP), a Network(5G network), an AI(Artificial Intelligence) system/module, an RSU(road side unit), a robot, a drone(UAV: Unmanned Aerial Vehicle), an AR(Augmented Reality) device, a VR(Virtual Reality) device, etc. In addition, a terminal may be fixed or mobile, and may be substituted with a term such as a UE(User Equipment), an MS(Mobile Station), a UT(user terminal), an MSS(Mobile Subscriber Station), an SS(Subscriber Station), an AMS(Advanced Mobile Station), a WT(Wireless terminal), an MTC(Machine-Type Communication) device, an M2M(Machine-to-Machine) device, a D2D(Device-to-Device) device, a vehicle, an RSU(road side unit), a robot, an AI(Artificial Intelligence) module, a drone(UAV: Unmanned Aerial Vehicle), an AR(Augmented Reality) device, a VR(Virtual Reality) device, etc.

The following description may be used for a variety of radio access systems such as CDMA, FDMA, TDMA, OFDMA, SC-FDMA, etc. CDMA may be implemented by a wireless technology such as UTRA(Universal Terrestrial Radio Access) or CDMA2000. TDMA may be implemented by a radio technology such as GSM(Global System for Mobile communications)/GPRS(General Packet Radio Service)/EDGE(Enhanced Data Rates for GSM Evolution). OFDMA may be implemented by a radio technology such as IEEE 802.11(Wi-Fi), IEEE 802.16(WiMAX), IEEE 802-20, E-UTRA(Evolved UTRA), etc. UTRA is a part of a UMTS (Universal Mobile Telecommunications System). 3GPP(3rd Generation Partnership Project) LTE(Long Term Evolution) is a part of an E-UMTS(Evolved UMTS) using E-UTRA and LTE-A(Advanced)/LTE-A pro is an advanced version of 3GPP LTE. 3GPP NR(New Radio or New Radio Access Technology) is an advanced version of 3GPP LTE/LTE-A/ LTE-A pro.

To clarify description, it is described based on a 3GPP communication system (e.g., LTE-A, NR), but a technical idea of the present disclosure is not limited thereto. LTE means a technology after 3GPP TS(Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For. 3GPP LTE, TS 36.211(physical channels and modulation), TS 36.212(multiplexing and channel coding), TS 36.213(physical layer procedures), TS 36.300(overall description), TS 36.331(radio resource control) may be referred to.

For 3GPP NR, TS 38.211(physical channels and modulation), TS 38.212(multiplexing and channel coding), TS 38.213(physical layer procedures for control), TS 38.214 (physical layer procedures for data), TS 38.300(NR and NG-RAN(New Generation-Radio Access Network) overall description), TS 38.331(radio resource control protocol specification) may be referred to.

Abbreviations of terms which may be used in the present disclosure is defined as follows.
- BM: beam management
- CQI: Channel Quality Indicator
- CRI: channel state information—reference signal resource indicator
- CSI: channel state information
- CSI-IM: channel state information—interference measurement
- CSI-RS: channel state information—reference signal
- DMRS: demodulation reference signal
- FDM: frequency division multiplexing
- FFT: fast Fourier transform
- IFDMA: interleaved frequency division multiple access
- IFFT: inverse fast Fourier transform
- L1-RSRP: Layer 1 reference signal received power
- L1-RSRQ: Layer 1 reference signal received quality
- MAC: medium access control
- NZP: non-zero power
- OFDM: orthogonal frequency division multiplexing
- PDCCH: physical downlink control channel
- PDSCH: physical downlink shared channel
- PMI: precoding matrix indicator
- RE: resource element
- RI: Rank indicator
- RRC: radio resource control
- RSSI: received signal strength indicator
- Rx: Reception
- QCL: quasi co-location
- SINR: signal to interference and noise ratio
- SSB (or SS/PBCH block): Synchronization signal block (including PSS (primary synchronization signal), SSS (secondary synchronization signal) and PBCH (physical broadcast channel))
- TDM: time division multiplexing
- TRP: transmission and reception point
- TRS: tracking reference signal
- Tx: transmission
- UE: user equipment
- ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB(enhanced mobile broadband communication), mMTC(massive MTC), URLLC(Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA(NG-Radio Access) user plane (i.e., a new AS(access stratum) sublayer/PDCP(Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF(Access and Mobility Management Function) through an N2 interface, and is connected to a UPF(User Plane Function) through an N3 interface.

Figure 2:
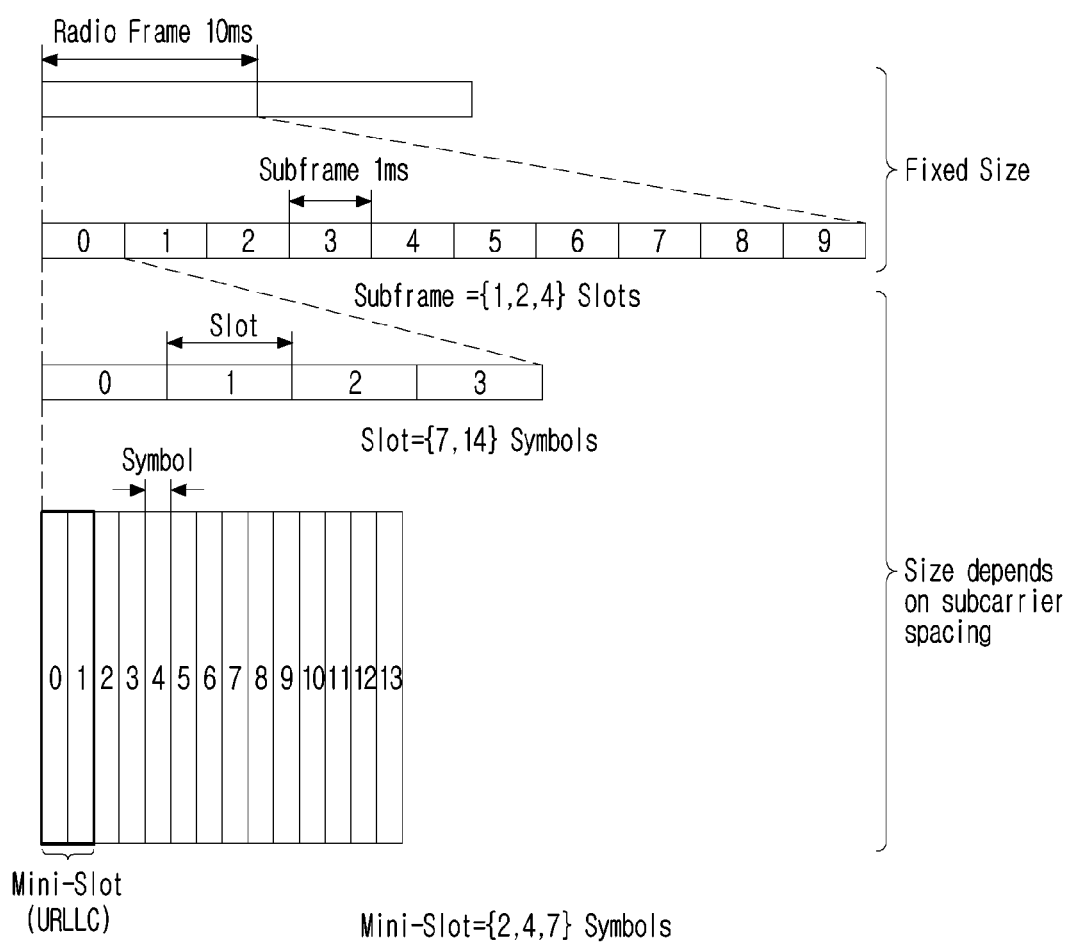
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |

TABLE 1-continued

| μ | Δf = $2^μ · 15$ [kHz] | CP |
|---|---|---|
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(Δf_{max}·N_f)$. Here, $Δf_{max}$ is 480-103 Hz and $N_f$ is 4096. Downlink and uplink transmission is configured (organized) with a radio frame having a duration of $T_f=1/(Δf_{max}N_f/100)·T_c=10$ ms. Here, a radio frame is configured with 10 subframes having a duration of $T_{sf}=(Δf_{max}N_f/1000)·T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})·T_c$ than a corresponding downlink frame in a corresponding terminal starts. For a subcarrier spacing configuration, slots are numbered in an increasing order of $n_s^μ∈\{0, \ldots, N_{slot}^{subframe,μ}-1\}$ in a subframe and are numbered in an increasing order of $n_{s,f}^μ∈\{0, \ldots, N_{slot}^{frame,μ}-1\}$ in a radio frame. One slot is configured with $N_{symb}^{slot}$ consecutive OFDM symbols and $N_{symb}^{slot}$ is determined according to CP. A start of a slot $n_s^μ$ in a subframe is temporally arranged with a start of an OFDM symbol $n_s^μN_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,μ}$) and the number of slots per subframe ($N_{slot}^{subframe,μ}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,μ}$ | $N_{slot}^{subframe,μ}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL(quasi co-located or quasi co-location) relationship. In this case, the large-scale property includes at least one of delay spread, doppler spread, frequency shift, average received power, received timing.

Figure 3:
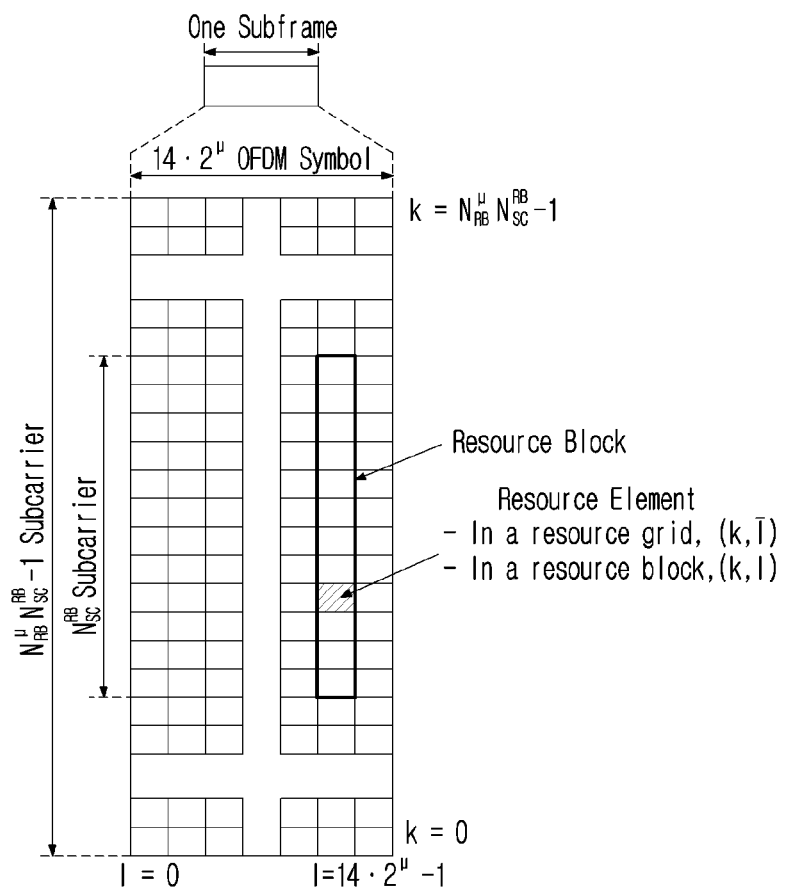
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^μN_{sc}^{RB}$ subcarriers in a frequency domain and one subframe is configured with 14-29 OFDM symbols, but it is not limited thereto. In an NR system, a transmitted signal is described by OFDM symbols of $2^μN_{symb}(g)$ and one or more resource grids configured with $N_{RB}^μN_{sc}^{RB}$ subcarriers. Here, $N_{RB}^μ≤N_{RB}^{max,μ}$. The $N_{RB}^{max,μ}$ represents a maximum transmission bandwidth, which may be different between an uplink and a downlink as well as between numerologies. In this case, one resource grid may be configured per and antenna port p. Each element of a resource grid for and an antenna port p is referred to as a resource element and is uniquely identified by an index pair (k,l'). Here, k=0, ..., $N_{RB}^μN_{sc}^{RB}-1$ is an index in a frequency domain and 1'=0, ..., $2^μN_{symb}^{(μ)}-1$ refers to a position of a symbol in a subframe. When referring to a resource element in a slot, an index pair (k,l) is used. Here, 1=0, ..., $N_{symb}^μ-1$. A resource element (k,l') for and an antenna port p corresponds to a complex value, $a_{k,l'}^{(p,μ)}$. When there is no risk of confusion or when a specific antenna port or numerology is not specified, indexes p and p may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration p is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
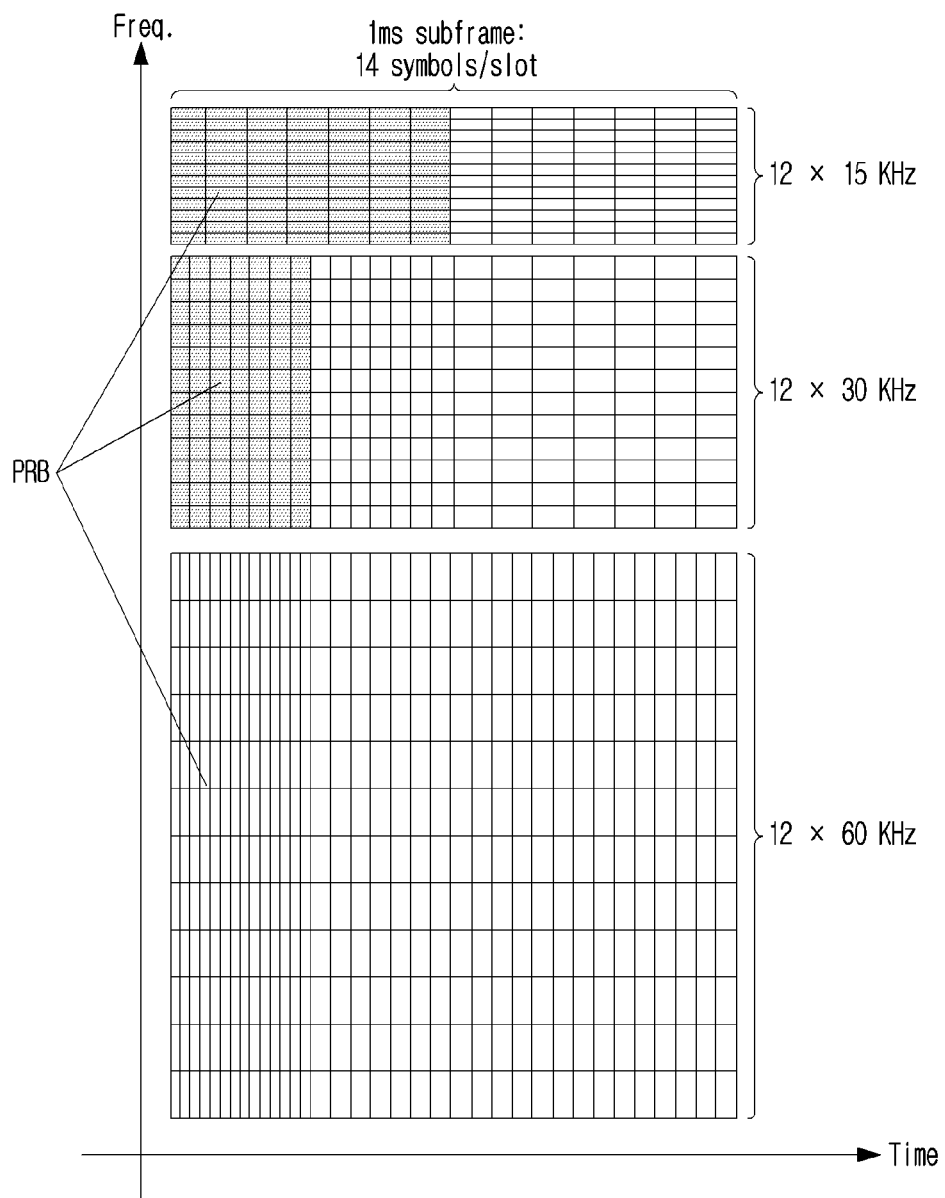
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
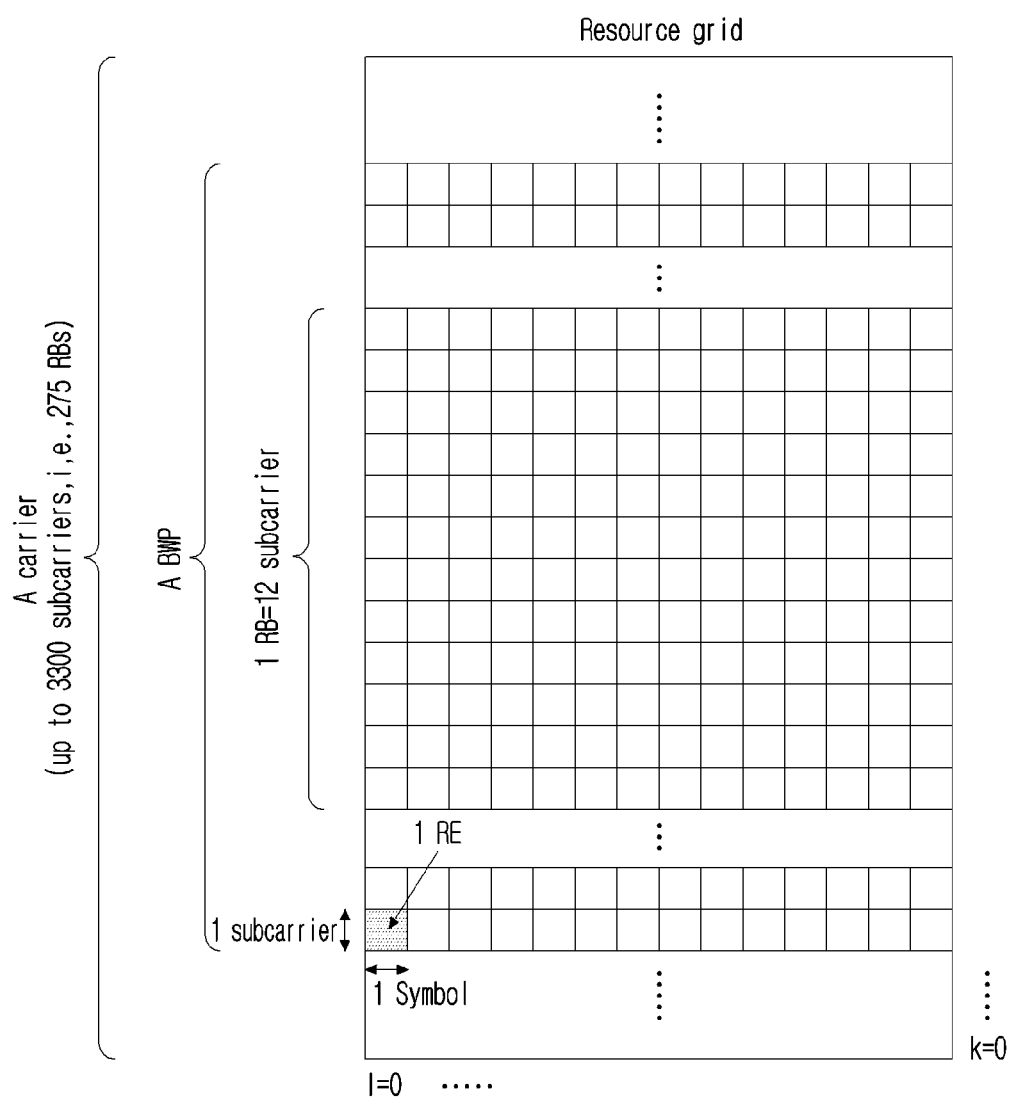
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP(Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE(Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
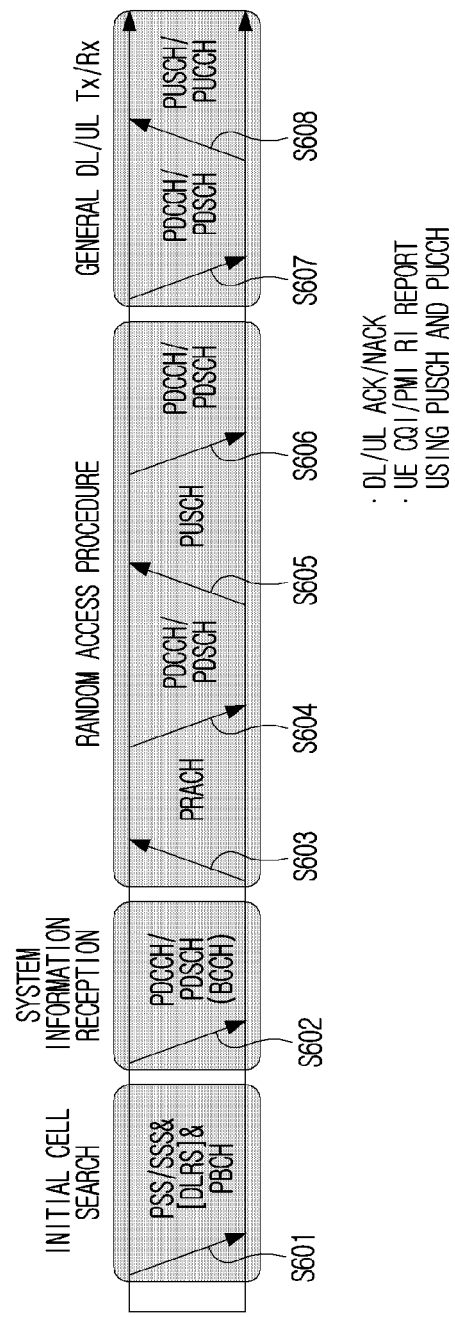
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random-access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH(Physical, Uplink Shared Channel)/

PUCCH(physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK(Acknowledgement/Non-Acknowledgement) signal, a CQI(Channel Quality Indicator), a PMI(Precoding Matrix Indicator), a RI(Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL(Supplementary UL), frequency resource allocation, time resource allocation, frequency hopping, etc.), information related to a transport block(TB) (e.g., MCS(Modulation Coding and Scheme), a NDI(New Data Indicator), a RV(Redundancy Version), etc.), information related to a HARQ(Hybrid— Automatic Repeat and request) (e.g., a process number, a DAI(Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 00 is CRC (cyclic redundancy check) scrambled by a C-RNTI(Cell Radio Network Temporary Identifier) or a CS-RNTI(Configured Scheduling RNTI) or a MCS-C-RNTI(Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI(Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB(virtual resource block)-PRB (physical resource block) mapping, etc.), information related to a transport block(TB)(e.g., MCS, NDI, RV, etc.), information related to a HARQ (e.g., a process number, DAI, PDSCH-HARQ feedback timing, etc.), information related to multiple antennas (e.g., an antenna port, a TCI(transmission configuration indicator), a SRS(sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-Co Locaton (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL(quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS(demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission(JT), coordinated Scheduling(CS), coordinated Beamforming (CB), dynamic Point Selection(DPS), dynamic Point Blocking(DPB), etc.

M-TRP transmission schemes that M TRPs transmit data to one terminal may be largely classified into i) eMBB M-TRP transmission, a scheme for improving a transfer rate, and ii) URLLC M-TRP, transmission, a scheme for increasing a reception success rate and reducing latency.

In addition, with regard to DCI transmission, M-TRP transmission schemes may be classified into i) M-TRP transmission based on M-DCI(multiple DCI) that each TRP transmits different DCIs and ii) M-TRP transmission based on S-DCI(single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

In addition, UE may recognize PUSCH (or PUCCH) scheduled by DCI received in different control resource sets(CORESETs)(or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N(ACK/NACK), SR(scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N(process/retransmission) for PDSCH/PUSCH, etc. scheduled per each TRP/panel may be managed per corresponding CORESET group (i.e., per TRP/panel belonging to the same CORESET group).

For example, ControlResourceSet information element (IE), a higher layer parameter, is used to configure a time/frequency CORESET (control resource set). In an example, the CORESET may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/CORESET-related TCI information, etc. In an example, an index of a CORESET pool (e.g., CORESETPoolIndex) may be configured as 0 or 1. In the description, a CORESET group may correspond to a CORESET pool and a CORESET group ID may correspond to a CORESET pool index (e.g., CORESETPoolIndex).

Hereinafter, a method for improving reliability in Multi-TRP will be described.

As a transmission and reception method for improving reliability using transmission in a plurality of TRPs, the following two methods may be considered.

Figure 7:
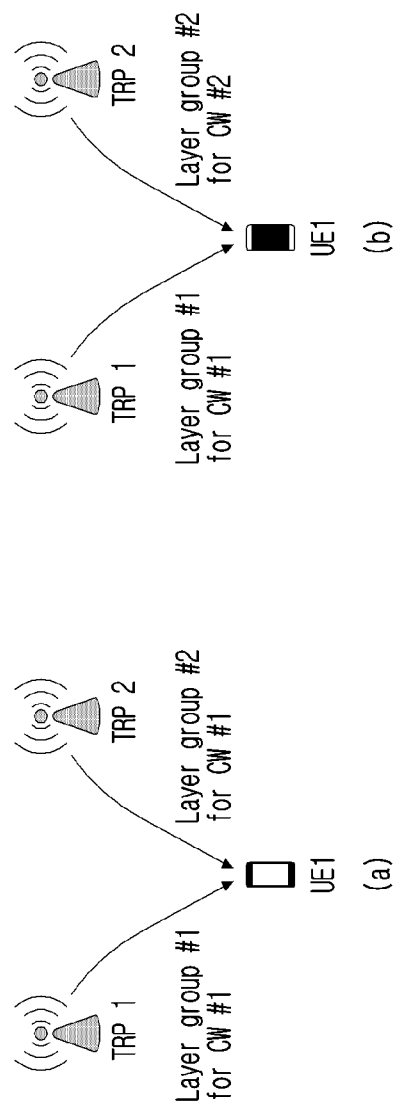
FIG. 7 illustrates a transmission method of multiple TRPs in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword(CW)/transport block(TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Multi-TRPs scheduled by at least one DCI may be performed as follows:

i) Scheme 1 (SDM): n (n is a natural number) TCI states in a single slot in overlapping time and frequency resource allocation Scheme 1a: Each transmission occasion is one layer or a set of layers of the same TB and each layer or layer set is associated with a set of one TCI and one DMRS port(s). A single codeword having one RV (redundancy version) is used for all layers or layer sets. With respect to a UE, different coded bits are mapped to different layers or layer sets by a specific mapping rule.

Scheme 1b: Each transmission occasion is one layer or a set of layers of the same TB and each layer or layer set is associated with a set of one TCI and one DMRS port(s). A single codeword having one RV is used for each spatial layer or layer set. RVs corresponding to each spatial layer or layer set may be the same or different.

Scheme 1c: Each transmission occasion is one layer of the same TB having one DMRS port associated with multiple TCI state indexes or one layer of the same TB having multiple DMRS ports associated with multiple TCI indexes one by one.

For the above-described scheme 1a and 1c, the same MCS is applied to all layers or layer sets.

ii) Scheme 2 (FDM): n (n is a natural number) TCI states in a single slot in non-overlapping frequency resource allocation. Each non-overlapping frequency resource allocation is associated with one TCI state. The same single/multiple DMRS port(s) are associated with all non-overlapping frequency resource allocation.

Scheme 2a: A single codeword having one RV is used across whole resource allocation. From a viewpoint of UE, common RB mapping (layer mapping of a codeword) is applied across all resource allocation.

Scheme 2b: A single codeword having one RV is used for each non-overlapping frequency resource allocation. RVs corresponding to each non-overlapping frequency resource allocation may be the same or different.

For Scheme 2a, the same MCS is applied to all non-overlapping frequency resource allocation.

iii) Scheme 3 (TDM): n (n is a natural number) TCI states in a single slot in non-overlapping time resource allocation. Each transmission occasion of a TB has one TCI and one RV by time granularity of a mini-slot. All transmission occasion(s) in a slot use a common MCS as the same single or multiple DMRS port(s). A RV/TCI state may be the same or different among transmission occasions.

iv) Scheme 4 (TDM): n (n is a natural number) TCI states in K (n<=K, K is a natural number) different slots. Each transmission occasion of a TB has one TCI and one RV. All transmission occasion(s) use a common MCS as the same single or multiple DMRS port(s) across K slots. A RV/TCI state may be the same or different among transmission occasions.

A Method for Supporting Multi-TRPs (M-TRPs)

MTRP-URLLC may mean that M-TRPs transmit the same transport block (TB) using different layers/time/frequency. It may be assumed that a UE configured with an MTRP-URLLC transmission method is indicated with multiple TCI state(s) by DCI, and data received using a QCL RS of each TCI state is the same TB. On the other hand, MTRP-eMBB may mean that M-TRPs transmit different TBs using different layers/time/frequencies. It may be assumed that a UE configured with an MTRP-eMBB transmission method is indicated with multiple TCI state(s) by DCI, and data received using a QCL RS of each TCI state are different TBs. In this regard, as a UE separates and uses an RNTI configured for an MTRP-URLLC purpose and an RNTI configured for an MTRP-eMBB purpose, it may be determined/decided whether corresponding M-TRP transmission is the URLLC transmission or the eMBB transmission. That is, when CRC masking of DCI received by a UE is performed using an RNTI configured for an MTRP-URLLC purpose, this may correspond to URLLC transmission, and when CRC masking of DCI is performed using an RNTI configured for an MTRP-eMBB purpose, this may correspond to eMBB transmission.

In the present disclosure, a TRP may mean an antenna array having one or more antenna elements available in a network located in a specific geographic location of a specific area. In the present disclosure, although described with reference to a "TRP" for convenience of description, as described above, a TRP may be understood/applied by being substituted with a base station, a transmission point (TP), a cell (e.g., a macro cell)/a micro cell (small cell)/a pico cell, etc.), an antenna array or a panel, a remote radio unit (RRU)/remote radio head (RRH). In addition, a base station may mean a generic term for an object that transmits and receives data with a terminal. For example, the base station may be a concept including one or more TPs (Transmission Points), one or more TRPs (Transmission and Reception Points), etc.

The present disclosure applies the proposed method by assuming cooperative transmission/reception between 2 TRPs for convenience of description, but it can be extended and applied even in a multi-TRP environment of 3 or more, and it can be also extended and applied in a multi-panel environment. Different TRPs may be recognized as different TCI states to a UE, and the UE receives/transmits data/DCI/UCI using TCI state 1 means receiving/transmitting data/DCI/UCI from/to TRP 1.

In addition, in the present disclosure, the meaning that a UE repeatedly transmits the same PUSCH for reception by a plurality of base stations (i.e., MTRP) may mean that the same data is transmitted through a plurality of PUSCHs, and each PUSCH may be transmitted while being optimized for UL channels of different TRPs. For example, a UE repeatedly transmits the same data through PUSCHs 1 and 2, PUSCH 1 is transmitted using UL TCI state 1 (or spatial relation info 1) for TRP 1, and link adaptation such as precoder/modulation coding scheme (MCS) is also scheduled with a value optimized for a channel of TRP 1 and the PUSCH 1 is transmitted. PUSCH 2 is transmitted using UL TCI state 2 (or spatial relation info 1) for TRP 2, and link adaptation such as a precoder/MCS is also scheduled with a value optimized for a channel of TRP 2 and the PUSCH 2 is transmitted. Here, repeatedly transmitted PUSCHs 1 and 2 may be TDMed by being transmitted at different times and may be FDMed, or SDMed.

In addition, in the present disclosure, the meaning that a UE divides and transmits the same PUSCH for reception by a plurality of base stations (i.e., MTRP) may mean that one data is transmitted through one PUSCH, but resources allocated to the PUSCH may be divided and transmitted by optimizing UL channels of different TRPs. For example, when a UE transmits the same data through 10 symbol PUSCH, the first 5 symbols are transmitted using UL TCI state 1 (or spatial relation info 1) for TRP 1, link adaptation such as precoder/MCS is also scheduled with a value optimized for a channel of TRP 1, and the first 5 symbols are transmitted, the remaining 5 symbols are transmitted using UL TCI state 2 (or spatial relation info 2) for TRP 2, link adaptation such as precoder/MCS is also scheduled with a value optimized for the channel of TRP 2, and the remaining 5 symbols are transmitted. In the above example, transmission to TRP 1 and transmission to TRP 2 were performed by dividing one PUSCH into time resources, but transmission may also be performed in an FDM/SDM method.

Similar to PUSCH transmission, a UE may repeatedly transmit the same PUCCH or divide and transmit the same PUCCH so that a plurality of base stations (i.e., MTRP) may receive the PUCCH.

The proposals of the present disclosure can be extended and applied to various channels such as PUSCH/PUCCH/PDSCH/PDCCH.

The proposals of the present disclosure can be extended and applied to both the case of repeatedly transmitting the channel in different time/frequency/spatial resources and the case of dividing and transmitting the channel.

In the present disclosure, that a UE transmits a PUSCH to a specific TRP may mean that the PUSCH is transmitted according to a configured specific UL TCI state. Alternatively, that a UE transmits a PUSCH to a specific TRP may mean that the PUSCH is transmitted according to configured specific spatial relation information. Alternatively, that a UE transmits a PUSCH to a specific TRP may mean that the PUSCH is transmitted based on a configured related CSI-RS. In other words, that a UE transmits a PUSCH to a specific TRP 0 may mean that the PUSCH is transmitted according to UL TCI state 0 or spatial relation info 0 or based on a related CSI-RS 0. Similarly, that a UE transmits a PUSCH to a specific TRP 1 may mean that the PUSCH is transmitted according to UL TCI state 1 or spatial relation info 1 or based on a related CSI-RS 1.

An existing NR UE uses a non-codebook based method or a codebook based method to determine a precoder for an uplink (UL) PUSCH.

In a non-codebook-based method, N 1-port SRS resources may be configured in one SRS resource set (e.g., N<5). A UE is indicated to have one or more and $L_{max}$ or less SRS resources in the SRS resource set through an SRS resource indicator (SRI) field of DCI. As a result, a size of an SRI field is determined as shown in Equation 3 below.

$$\text{ceil}\left(\log 2\left(\sum_{i=1}^{L_{max}} C(N, i)\right)\right) \qquad \text{[Equation 3]}$$

In Equation 3, C(N,i) means the number of cases in which i is selected from among N, regardless of order. The number of SRS resources selected (indicated) in this way is equal to a PUSCH rank. A UE uses a precoder (/beam) applied to the selected (indicated) SRS resource as a PUSCH transmission (tx) precoder (/beam).

In codebook based transmission, a PUSCH may be scheduled by DCI format 0_0, DCI format 0_1, DCI format 0_2 or semi-statically configured. A UE determines a PUSCH transmission precoder based on an SRS resource indicator (SRI), a transmission precoding matrix indicator (TPMI), and a transmission rank. Here, an SRI, a TPMI, and a transmission rank are given by an SRS resource indicator field and a precoding information and number of layers field in DCI, respectively. Alternatively, an SRI, a TPMI, and a transmission rank are given by a higher layer parameter (srs-ResourceIndicator) for an SRS resource indication and a higher layer parameter (precodingAndNumberOfLayers) for indicating precoding and the number of layers. An SRS resource set(s) applicable to a PUSCH is defined by a higher layer parameter (i.e., srs-ResourceSetToAddModList or srs-ResourceSetToAddModListDCI-0-2) related to an SRS resource set in an SRS configuration (i.e., SRS-config). A TPMI is used to indicate a precoder to be applied in layers $\{0, \ldots, v-1\}$, and corresponds to an SRS resource selected by an SRI when multiple SRS resources are configured. Alternatively, when a single SRS resource is configured, a TPMI is used to indicate a precoder to be applied in layers $\{0, \ldots, v-1\}$, and corresponds to the SRS resource. A transmission precoder is selected from an uplink codebook having the same number of antenna ports as a higher layer parameter (nrofSRS-Ports) for the number of SRS antenna ports in an SRS configuration (i.e., SRS-Config).

When a UE is configured with a higher layer parameter (i.e., txConfig) for a transmission configuration set to 'codebook', the UE is configured with at least one SRS resource. An SRI indicated in slot n is associated with the most recent transmission of an SRS resource identified by the SRI, where the SRS resource is transmitted prior to a PDCCH carrying the SRI.

In a codebook-based method, a rank/precoding matrix indicator (PMI) is indicated through a transmission precoding matrix indicator (TPMI) field of DCI. In addition, one of 2 (or 4) SRS resources defined in one SRS resource set is indicated through a 1 (or 2) bit of an SRI field of DCI. A UE performs UL PUSCH transmission by applying a PMI indicated through a TPMI field to ports of an SRS resource selected (indicated) as described above. Here, a specific UL beam (e.g., analog beam) is equally applied to ports of an SRS resource, and a final precoder is generated by applying a PMI to ports to which the specific UL beam is applied.

Hereinafter, contents related to an SRS resource indicator/Precoding information and number of layers field of TS 38.212 will be described.

i) SRS resource indicator (SRI)—A size of this field is equal to bits according to Equation 4 below or ceil(log 2($N_{SRS}$)) (ceil(x) is the smallest integer not smaller than x) bits. Here, $N_{SRS}$ is the number of configured SRS resources in an SRS resource set configured by a higher layer parameter srs-ResourceSetToAddModList related an SRS resource set, and associated with a higher layer parameter usage related to an SRS usage of value 'codeBook' or 'nonCodeBook'.

$$\left\lceil \log_2\left(\sum_{k=1}^{\min\{L_{max}, N_{SRS}\}} \binom{N_{SRS}}{k}\right) \right\rceil \qquad \text{[Equation 4]}$$

If a high layer parameter transmission setting (txConfig) is 'nonCodebook', a size of an SRI field is equal to bits according to Equation 4 above. Here, $N_{SRS}$ is the number of configured SRS resources in an SRS resource set configured by a higher layer parameter srs-ResourceSetToAddModList related to an SRS resource set, and associated with a higher layer parameter usage of value 'nonCodeBook'

Here, if a UE supports an operation with maxMIMO-Layers and a higher layer parameter maxMIMO-Layers of PUSCH-ServingCellConfig of a serving cell is configured, $L_{max}$ is given by that parameter. Otherwise, $L_{max}$ is given by the maximum number of layers for a PUSCH supported by a UE for a serving cell for non-codebook based operation A size of an SRI field is ceil($\log_2(N_{SRS})$) bits if a higher layer parameter txConfig='codebook'. $N_{SRS}$ is the number of configured SRS resources in an SRS resource set configured by a higher layer parameter srs-ResourceSetToAddModList related to an SRS resource set, and associated with a higher layer parameter usage of value 'codeBook'.

ii) Precoding information and number of layers—the number of bits in this field is determined as follows:

0 bits if the higher layer parameter txConfig=nonCodeBook;

0 bits for 1 antenna port and if the higher layer parameter txConfig=codebook;

4, 5, or 6 bits according to a predetermined table for 4 antenna ports, if a higher layer parameter txConfig=codebook, ULFPTxModes is either not configured or configured to Mode2, and according to whether transform precoder is enabled or disabled, and the values of a higher layer parameter maxRank for a max rank, and a higher layer parameter codebookSubset for a codebook subset;

4 or 5 bits according to a predetermined table for 4 antenna ports, if a higher layer parameter txConfig=codebook, ULFPTxModes=Mode1, a higher layer parameter maxRank=2, transform precoder is disabled, and according to a higher layer parameter codebookSubset for a codebook subset;

4 or 6 bits according to a predetermined table for 4 antenna ports, if a higher layer parameter txConfig=codebook, ULFPTxModes=Mode1, a higher layer parameter maxRank=3 or 4, transform precoder is disabled, and according to a higher layer parameter codebookSubset for a codebook subset;

2, 4, or 5 bits according to a predetermined table for 4 antenna ports, if a higher layer parameter txConfig=codebook, ULFPTxModes is either not configured or configured to Mode2, and according to whether transform precoder is enabled or disabled, and a higher layer parameter maxRank for a max rank, and a higher layer parameter codebookSubset for a codebook subset;

3 or 4 bits according to a predetermined table for 4 antenna ports, if a higher layer parameter txConfig=codebook, ULFPTxModes=Mode1, a higher layer parameter maxRank=1, and according to whether transform precoder is enabled or disabled, and a higher layer parameter codebookSubset for a codebook subset;

2 or 4 bits according to a predetermined table for 2 antenna ports, if a higher layer parameter txConfig=codebook, ULFPTxModes is either not configured or configured to Mode2, and according to whether transform precoder is enabled or disabled, a higher layer parameter maxRank for a max rank and a higher layer parameter codebookSubset for a codebook subset;

2 bits according to a predetermined table for 2 antenna ports, if a higher layer parameter txConfig=codebook, ULFPTxModes=Mode1, transform precoder is disabled, a higher layer parameter maxRank=2, and a higher layer parameter codebookSubset=noncoherent;

1 or 3 bits according to a predetermined table for 2 antenna ports, if txConfig=codebook, ULFPTxModes is either not configured or configured to Mode2, and according to whether transform precoder is enabled or disabled, and a higher layer parameter maxRank for a max rank and a higher layer parameter codebookSubset for a codebook subset;

2 bits according to a predetermined table for 2 antenna ports, if a higher layer parameter txConfig=codebook, ULFPTxModes=Mode1, a higher layer parameter maxRank=1, and according to whether transform precoder is enabled or disabled, and a higher layer parameter codebookSubset for a codebook subset;

For a higher layer parameter txConfig=codebook, if different SRS resources with different number of antenna ports are configured, a bitwidth of this field is determined according to the maximum number of ports in a SRS resource among the configured SRS resources. If the number of ports for a configured SRS resource is less than the maximum number of ports in a SRS resource among the configured SRS resources, a number of most significant bits (MSB) with value set to '0' are inserted to the field.

Hereinafter, precoding is described.

A block of vectors $[y^{(0)}(i), \ldots, y^{(v-1)}(i)]^T$ (i=0, 1, ..., $M_{symb}^{layer}-1$) is precoded according to Equation 5 below.

$$\begin{bmatrix} z^{(p_0)}(i) \\ \vdots \\ z^{(p_{p-1})}(i) \end{bmatrix} = W \begin{bmatrix} y^{(0)}(i) \\ \vdots \\ y^{(v-1)}(i) \end{bmatrix}$$ [Equation 5]

In Equation 5, i=0, 1, ..., $M_{symb}^{ap}-1$, $M_{symb}^{ap}=M_{symb}^{layer}$. A set of antenna ports $\{p_0, \ldots, p_{p-1}\}$ is determined according to 3GPP TS 38.214.

For non-codebook-based transmission, a precoding matrix W equals the identity matrix. For codebook-based transmission, a precoding matrix W is given by W=1 for single-layer transmission on a single antenna port, otherwise it is given by a predetermined table with a TPMI index obtained from DCI scheduling uplink transmission or a higher layer parameter according to the procedure in 3GPP TS 38.214. When a higher-layer parameter txConfig is not configured, a precoding matrix W=1.

Table 6 illustrates a precoding matrix (W) for single-layer transmission using two antenna ports.

In Table 6, a precoding matrix W is sorted from left to right in ascending order of a TPMI index.

TABLE 6

| TPMI index | W |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

Table 7 illustrates a precoding matrix (W) for single-layer transmission using four antenna ports when transform precoding is enabled.

In Table 7, a precoding matrix W is sorted from left to right in ascending order of a TPMI index.

TABLE 7

| TPMI index | W |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

Table 8 illustrates a precoding matrix (W) for single-layer transmission using four antenna ports when transform precoding is disabled.

In Table 8, a precoding matrix W is sorted from left to right in ascending order of a TPMI index.

TABLE 8

| TPMI index | W | | | | | |
|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ |
| | $\frac{1}{2}\begin{bmatrix}1\\0\\j\\0\end{bmatrix}$ | $\frac{1}{2}\begin{bmatrix}1\\0\\-j\\0\end{bmatrix}$ | | | | |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ |
| | $\frac{1}{2}\begin{bmatrix}1\\1\\-1\\-1\end{bmatrix}$ | $\frac{1}{2}\begin{bmatrix}1\\1\\-j\\-j\end{bmatrix}$ | | | | |
| 16-23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ |
| | $\frac{1}{2}\begin{bmatrix}1\\-1\\-1\\1\end{bmatrix}$ | $\frac{1}{2}\begin{bmatrix}1\\-1\\-j\\j\end{bmatrix}$ | | | | |
| 24-27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | — | — |
| | — | — | | | | |

Table 9 illustrates a precoding matrix (W) for two-layer transmission using two antenna ports when transform precoding is disabled.

In Table 9, a precoding matrix W is sorted from left to right in ascending order of a TPMI index.

TABLE 9

| TPMI index | W |
|---|---|
| 0-2 | $\frac{1}{\sqrt{2}}\begin{bmatrix} 1 & 0 \\ 0 & 1 \end{bmatrix}$ $\quad$ $\frac{1}{2}\begin{bmatrix} 1 & 1 \\ 1 & -1 \end{bmatrix}$ $\quad$ $\frac{1}{2}\begin{bmatrix} 1 & 1 \\ j & -j \end{bmatrix}$ |

Table 10 illustrates a precoding matrix (W) for two-layer transmission using two antenna ports when transform precoding is disabled.

In Table 10, a precoding matrix W is sorted from left to right in ascending order of a TPMI index.

TABLE 10

| TPMI Index | W |
|---|---|
| 0-3 | $\frac{1}{2}\begin{bmatrix} 1 & 0 \\ 0 & 1 \\ 0 & 0 \\ 0 & 0 \end{bmatrix}$ $\quad$ $\frac{1}{2}\begin{bmatrix} 1 & 0 \\ 0 & 0 \\ 0 & 1 \\ 0 & 0 \end{bmatrix}$ $\quad$ $\frac{1}{2}\begin{bmatrix} 1 & 0 \\ 0 & 0 \\ 0 & 0 \\ 0 & 1 \end{bmatrix}$ $\quad$ $\frac{1}{2}\begin{bmatrix} 0 & 0 \\ 1 & 0 \\ 0 & 1 \\ 0 & 0 \end{bmatrix}$ |
| 4-7 | $\frac{1}{2}\begin{bmatrix} 0 & 0 \\ 1 & 0 \\ 0 & 0 \\ 0 & 1 \end{bmatrix}$ $\quad$ $\frac{1}{2}\begin{bmatrix} 0 & 0 \\ 0 & 0 \\ 1 & 0 \\ 0 & 1 \end{bmatrix}$ $\quad$ $\frac{1}{2}\begin{bmatrix} 1 & 0 \\ 0 & 1 \\ 1 & 0 \\ 0 & -j \end{bmatrix}$ $\quad$ $\frac{1}{2}\begin{bmatrix} 1 & 0 \\ 0 & 1 \\ 1 & 0 \\ 0 & j \end{bmatrix}$ |
| 8-11 | $\frac{1}{2}\begin{bmatrix} 1 & 0 \\ 0 & 1 \\ -j & 0 \\ 0 & 1 \end{bmatrix}$ $\quad$ $\frac{1}{2}\begin{bmatrix} 1 & 0 \\ 0 & 1 \\ -j & 0 \\ 0 & -1 \end{bmatrix}$ $\quad$ $\frac{1}{2}\begin{bmatrix} 1 & 0 \\ 0 & 1 \\ -1 & 0 \\ 0 & -j \end{bmatrix}$ $\quad$ $\frac{1}{2}\begin{bmatrix} 1 & 0 \\ 0 & 1 \\ -1 & 0 \\ 0 & j \end{bmatrix}$ |
| 12-15 | $\frac{1}{2}\begin{bmatrix} 1 & 0 \\ 0 & 1 \\ j & 0 \\ 0 & 1 \end{bmatrix}$ $\quad$ $\frac{1}{2}\begin{bmatrix} 1 & 0 \\ 0 & 1 \\ j & 0 \\ 0 & -1 \end{bmatrix}$ $\quad$ $\frac{1}{2\sqrt{2}}\begin{bmatrix} 1 & 1 \\ 1 & 1 \\ 1 & -1 \\ 1 & -1 \end{bmatrix}$ $\quad$ $\frac{1}{2\sqrt{2}}\begin{bmatrix} 1 & 1 \\ 1 & 1 \\ j & -j \\ j & -j \end{bmatrix}$ |
| 16-19 | $\frac{1}{2\sqrt{2}}\begin{bmatrix} 1 & 1 \\ j & j \\ 1 & -1 \\ j & -j \end{bmatrix}$ $\quad$ $\frac{1}{2\sqrt{2}}\begin{bmatrix} 1 & 1 \\ j & j \\ j & -j \\ -1 & 1 \end{bmatrix}$ $\quad$ $\frac{1}{2\sqrt{2}}\begin{bmatrix} 1 & 1 \\ -1 & -1 \\ 1 & -1 \\ -1 & 1 \end{bmatrix}$ $\quad$ $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix}$ $\quad$ $\frac{1}{2\sqrt{2}}\begin{bmatrix} 1 & 1 \\ -j & -j \\ j & -j \\ 1 & -1 \end{bmatrix}$ $\quad$ — $\quad$ — |

Table 11 illustrates a precoding matrix (W) for three-layer transmission using four antenna ports when transform precoding is disabled.

In Table 11, a precoding matrix W is sorted from left to right in ascending order of a TPMI index.

TABLE 11

| TPMI index | W | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

Table 12 illustrates a precoding matrix (W) for 4-layer transmission using 4 antenna ports when transform precoding is disabled.

In Table 12, a precoding matrix W is sorted from left to right in ascending order of a TPMI index.

TABLE 12

| TPMI index | W | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

In the present disclosure, when signals and/or channels are transmitted and received between multiple TRPs (i.e., multiple TRPs (MTRP)) and a UE using time division multiplexing (TDM)/frequency division multiplexing (FDM)/spatial division multiplexing (SDM) schemes, a method for transmitting/receiving the same DCI/data transport block (TB)/uplink control information (UCI) is proposed.

In MTRP-URLLC, transmission and reception are performed by multiplexing of SDM/FDM/TDM, respectively, depending on whether resource regions in which the same TB is repeatedly transmitted are of different layers/different frequencies/different time. In order to obtain a higher diversity gain, repeated transmission of the same TB may be performed using more than two resource regions among SDM/FDM/TDM.

In this case, an agreement between a base station and a UE about how to map multiple TCI states indicated through a TCI field of a single DCI to different layer/different frequency/different time resources may need to be configured.

Hereinafter, for convenience of description, a case in which a UE transmits a PUSCH targeting two TRPs will be mainly described, but the present disclosure is not limited thereto. That is, a PUSCH may be transmitted in a plurality of transmission occasions (TOs) with a plurality of TRPs, where the plurality of TOs may be grouped by the number of TRPs. For example, when a PUSCH is transmitted to 2 TRPs on 4 TOs, the PUSCH may be transmitted to TRP 1 in TO 1, the PUSCH may be transmitted to TRP 2 in TO 2, the PUSCH may be transmitted to TRP 1 in TO 3, the PUSCH may be transmitted to TRP 2 in TO 4.

Here, a PUSCH may be transmitted based on a precoding vector group associated with each TO group (i.e., TRP) through which the PUSCH is transmitted. For example, a precoding vector group may be determined as one or more precoding vectors constituting a precoding matrix indicated by a TPMI field in DCI. Hereinafter, a method for determining a precoding vector for each TRP will be described in detail.

In the following description of the present disclosure, each row of a precoding matrix corresponds to an antenna port. That is, each row vector (i.e., a vector composed of a single row) of a precoding matrix corresponds to a precoding vector corresponding to a specific antenna port. Also, each column of a precoding matrix corresponds to a layer. That is, each column vector (i.e., a vector composed of a single column) of a precoding matrix corresponds to a precoding vector corresponding to a specific layer.

Problem 1: In order to determine a PMI of a MTRP PUSCH through a codebook-based method, it is necessary to indicate a PMI to be applied to each TRP PUSCH. To this end, it is possible to simply extend a TPMI field in single DCI to two TPMI fields so that each TPMI field indicates a PMI of each TRP. However, this method has a disadvantage of increasing DCI overhead.

Embodiment 1-1: Method of Configuring/Allocating to Two TRPs by Dividing the Indicated Rank In this embodiment, a method in which a rank indicated by a single TPMI field is shared (i.e., divided and indicated) by two TRPs (i.e., PUSCHs in which different TCI states or different spatial relationship information are configured) is proposed.

More specifically, in order to solve the above-described problem 1, as in the existing method, only one TPMI field of DCI may be configured, and a PMI and a rank may be indicated by a single TPMI field. The precoding vectors (i.e., column vectors) constituting a precoding matrix indicated in this way may be divided into two groups (e.g., precoding vector group 0 or precoding vector group 1) according to a predetermined rule. Here, groups 0 and 1 may be applied to PUSCH transmission occasions (TO) of TRP 0 (i.e., TCI state 0) and TRP 1 (i.e., TCI state 1), respectively.

That is, one precoding vector group may be determined as one or more precoding vectors among precoding vectors for each layer constituting a precoding matrix indicated by a TPMI field in DCI. For example, assuming PUSCH transmission to two TRPs, a first precoding vector group may be applied to a PUSCH transmitted to a first TRP (i.e., a PUSCH transmitted in a first TO group), where a first precoding vector group may be determined as one or more precoding vectors for some layers in a precoding matrix. In addition, a second precoding vector group may be applied to a PUSCH transmitted to a second TRP (i.e., a PUSCH transmitted in a second TO group), where a second precoding vector group may be determined as one or more precoding vectors for some layers in a precoding matrix.
Precoding Vector Group Determination Method 1

As an example of a rule for grouping precoding vectors, from the first vector (i.e., the first column vector) to the ceil (rank/2)th vector (i.e., column vector) among rank precoding vectors constituting a precoding matrix may be grouped into group 0, and the remaining vectors (i.e., column vector) may be grouped into group 1. Also, the reverse is also possible.

For example, in a 4×4 precoding vector composed of 4 rows and 4 columns as shown in Table 12 above, the first column vector (i.e., the leftmost vector) and the second column vector may be grouped into group 0, and third column vector and fourth column vector may be grouped into group 1.
Precoding Vector Group Determination Method 2

As another example of a rule for grouping precoding vectors, each column vector constituting a precoding matrix may be grouped according to the number of a row element of the column vector that have a non-zero value (or according to an index of a row of a non-zero element or according on which antenna port a non-zero element is a row element for). For example, a 4×4 precoding matrix may be composed of four column vectors (i.e., a 4×1 first column vector, a 4×1 second column vector, a 4×1 third column vector, and a 4×1 fourth column vector). Here, when elements that do not have a value of 0 in the column vector are the first and third row elements, the corresponding column vector(s) may be grouped into group 1 of the precoding vector. On the other hand, if elements that do not have a value of 0 in the column vector are the second and fourth row elements, the corresponding column vector(s) may be grouped into group 1 of the precoding vector.

For example, when a 4 transmission (4 Tx) partial coherent codebook is configured, each precoding vector (i.e., each column vector constituting each precoding matrix) may be configured so that i) the first and third row elements (i.e., elements applied to PUSCH antenna ports 1000 and 1002) have non-zero values and the remaining row elements have zero values, or ii) the second and fourth row elements (i.e., elements applied to PUSCH antenna ports 1001 and 1003) have non-zero values and the remaining row elements have zero values. Alternatively, vice versa.

Using this characteristic, precoding vectors having non-zero values in the first and third elements (i.e., the first and third row elements) are assigned to group 0 (i.e., grouped), and precoding vectors having non-zero values in the second and fourth elements (i.e., the second and fourth row elements) may be assigned to group 1 (i.e., grouped).

In the case of a UE having multiple antenna ports, antenna ports may be coherent or non-coherent. A UE can control the relative phases of signals transmitted through coherent antenna ports, but cannot control the relative phases of signals transmitted through non-coherent antenna ports. Partial coherent refers to a set of antenna ports including coherent antenna ports and non-coherent antenna ports.

For example, in Table 10 above, TPMI indexes 0 to 5 indicate entries (i.e., precoding matrices) for non-coherent transmission, and TPMI indexes 6 to 13 indicate entries (i.e., precoding matrices) for partial coherent transmission, and TPMI indexes 14 to 21 indicated entries (i.e., precoding matrices) for full coherent transmission.

For example, in the 4 Tx codebook of rank 2 of Table 10 above, when entry 6 (i.e., TPMI index=6) is indicated through a TPMI field, the first vector (e.g., the first column vector) may correspond to group 0, and the second vector (e.g., the second column vector) may correspond to group 1. Or vice versa.

In addition, the above-described method may also be applied to a non-coherent codebook. In the case of a non-coherent codebook, there is one element having a non-zero value among precoding vectors, precoding vectors may be grouped according to the number row element constituting the vector of the non-zero element (i.e., according to an index of a row of the element that is not a zero value). For example, a precoding vector in which an element with a non-zero value is the first or third row element belongs to group 0, and a precoding vector in which an element with a non-zero value is the second or fourth row element belongs to group 1. In this case, in the 4 Tx codebook of rank 2 of Table 10 above, when entry 3 (i.e., TPMI index=3) is indicated through a TPMI field, the first vector (e.g., the first column vector) may correspond to group 1, and the second vector (e.g., the second column vector) may correspond to group 0.

Alternatively, for example, a precoding vector in which an element having a non-zero value is the first or second row element belongs to group 0, and a precoding vector in which an element having a non-zero value is the third or fourth element may belong to group 1. In this case, in the 4 Tx codebook of rank 2 of Table 10 above, if entry 3 (i.e., TPMI index=3) is indicated through a TPMI field, the first vector (e.g., the first column vector) may correspond to group 1, and the second vector (e.g., the second column vector) may correspond to group 1.

Subsequently, a UE may transmit a PUSCH by applying a precoding vector of group 0 for a 4-port SRS (e.g., SRS resource 0) used for PUSCH transmission toward TRP 0 at a PUSCH transmission occasion (TO) (i.e., PUSCH transmission TO using UL TCI state 0 or PUSCH transmission TO using spatial relation info 0) of TRP 0. Similarly, a UE may transmit a PUSCH by applying a precoding vector of group 1 for a 4 port SRS (e.g., SRS resource 1) used for PUSCH transmission toward TRP 1 at a PUSCH TO (i.e., PUSCH transmission TO using UL TCI state 1 or PUSCH transmission TO using spatial relation info 1) of TRP 1.

However, when the above-described partial coherent codebook is applied, 0 is applied to 2 ports of a 4-port SRS in a process of applying a precoding vector, and the corresponding port is muted. For example, if TPMI index 6 is indicated in Table 10 above, the first column vector may correspond to group 0, and two antenna ports corresponding to element 0 may be muted. Similarly, the second column vector may correspond to group 1, and two antenna ports corresponding to element 0 may be muted.

Similarly, when a non-coherent codebook is applied, 0 is applied to three ports of a 4-port SRS in a process of applying a precoding vector, and the corresponding port may be muted.

Hereinafter, for convenience of description, a case in which a partial coherent codebook is applied will be described as an example.

Therefore, since for SRS resource 0 and SRS resource 1, a PUSCH is transmitted using only 2 ports out of 4 ports, UL resources for transmitting muted 2-port SRS are wasted. In order to avoid such waste of resources, this proposal proposes a method of configuring an SRS resource with only 2 ports despite using 4 Tx codebooks.

In the above example, both SRS resources 0 and 1 may be configured with 2 ports instead of 4 ports. In addition, a UE may transmit a PUSCH by applying values of non-zero elements (i.e., the first element and the third element) of a precoding vector of group 0 to port 0 and port 1 of SRS resource 0, respectively. Similarly, a UE may transmit a PUSCH by applying values of non-zero elements (i.e., the second element and the fourth element) of a precoding vector of group 1 to port 0 and port 1 of SRS resource 1, respectively. As a result, the proposed method performs UL PUSCH transmission using the same port and the same precoder as the existing codebook-based precoding method using a 4 port SRS resource, but uses a 2 port SRS instead of 4 ports, so the effect of reducing the SRS overhead can be obtained.

Meanwhile, when codebook subset configurations of TRP 0 and TRP 1 are different in the above embodiment, for example, when a codebook subset configuration is given that TRP 0 is full coherent and TRP 1 is partial coherent, there may be issues where it is ambiguous which one to follow. In this case, a UE may assume a large subset (i.e., full coherent in the above example) or a small subset (i.e., partial coherent in the above example). For example, a codebook subset may be configured based on a PUSCH-related configuration (e.g., PUSCH-Config), and it may be configured with one of full- and partial- and non-coherent (fullyAndPartialAndNonCoherent)/partial- and non-coherent (partialAndNonCoherent)/non-coherent. In addition, a codebook subset may be configured with a subset of PMIs given by a TPMI. Here, PMIs represent PMIs supported by a UE with the maximum coherent capacity.

Embodiment 1-2: Method of Configuring/Allocating the Indicated Antenna Ports to Two TRPs In order to solve the above-described problem 1, the present embodiment proposes a method in which two TRPs (i.e., PUSCHs with different TCI states or different spatial relationship information) share (i.e., are divided and indicated) antenna ports indicated by a single TPMI field. More specifically, as in the existing method, only one single TPMI field of DCI is configured, and a PMI and a rank can be indicated by the single TPMI field. N (N is a natural number) groups may be generated by manipulating/resetting precoding vectors constituting the indicated precoding matrix. For example, precoding vectors may be divided and generated into group 0 and group 1. Here, groups 0 and 1 may be applied to PUSCH TOs of TRPs 0 and 1, respectively.

Here, a precoding vector group may be configured with all vectors of the corresponding precoding matrix after setting (resetting) all elements of rows other than elements of a row assigned/indicated to the group are to zero.

For example, group 0 may be composed of all vectors of the precoding matrix after setting (resetting) elements of the $i_{01}$ and $i_{02}$ rows of the indicated precoding matrix to 0 (zero). Group 1 may be composed of all vectors of the precoding matrix after setting (resetting) elements of the $i_{11}$ and $i_{12}$ rows of the indicated precoding matrix to 0 (zero). For example, $i_{01}$, $i_{02}$, $i_{11}$, $i_{12}$ may be set to 1 (i.e., the first row), set to 2 (i.e., the second row), set to 3 (i.e., the third row), and set to 4 (i.e., the fourth row), respectively, or a base station may indicate an arbitrary value to a UE. In this case, group 0 may be composed of all vectors of the precoding matrix in which elements of the first and second rows are reset to 0. Similarly, group 1 may be composed of all vectors of the precoding matrix in which elements of the third and fourth rows are reset to 0.

Through this method, a UE may transmit data (i.e., PUSCH) in every PUSCH TO with the indicated rank. Here, a UE may transmit data (i.e., PUSCH) at PUSCH TO of TRP 0 using antenna ports $i_{11}$ and $i_{12}$, and transmit data (i.e., PUSCH) at PUSCH TO of TRP 1 using antenna ports $i_{01}$ and $i_{02}$. Here, since a pathloss reference signal (PLRS), a spatial relation RS, or a QCL RS is different for each PUSCH TO (i.e., TRP is different), {PLRS or spatial relation RS or QCL RS} of antenna ports $i_{01}$ and $i_{02}$ and {PLRS or spatial relation RS or QCL RS} of ports $i_{11}$ and $i_{12}$ may be configured differently.

However, this method, for example, when a rank indicated in Table 10 above is 2, since precoding orthogonalization is not established between layers transmitted in each PUSCH TO, inter-layer interference may occur.

Thus, if rank 2 is indicated, a precoding vector group may be configured with all vectors of the corresponding precoding matrix after elements of different rows are set (reset) to zero for each layer (i.e., each column vector).

For example, when configuring group 0 for inter-layer orthogonalization when rank 2 is indicated, elements of the $i_{01}$ and $i_{02}$ rows of the first vector of the indicated precoding matrix may be reset to 0 (zero) and elements of the $i_{11}$ and $i_{12}$ rows of the second vector may be reset to 0 (zero). In addition, when configuring group 1, elements of the $i_{11}$ and $i_{12}$ rows of the first vector of the indicated precoding matrix may be reset to 0 (zero) and elements of the $i_{01}$ and $i_{02}$ rows of the second vector may be reset to 0 (zero).

Even in the case of rank 2 or higher, the method can be extended and applied.

Meanwhile, in the description of the above embodiments 1-1 and 1-2, a method of dividing/resetting precoding vectors constituting a precoding matrix into two groups was proposed, but it is also possible to divide/reset into a plurality of groups of two or more through the same method.

Problem 2: When transmitting MTRP PUSCH, if precoders of TRP 0 and 1 are rank 2 PMI 1 and rank 2 PMI 2, respectively, and four PUSCH TOs are configured to divide or repeatedly transmit the same data, a UE may transmit a PUSCH to TRPs 0, 1, 0, and 1 on PUSCH transmission occasions (TO) 1, 2, 3, and 4, respectively. That is, a UE may transmit a PUSCH according to UL TCI state 0 (or spatial relationship information 0) in PUSCH TO 1, may transmit a PUSCH according to UL TCI state 1 (or spatial relationship information 1) in PUSCH TO 2, may transmit a PUSCH according to UL TCI state 0 (or spatial relationship information 0) in PUSCH TO 2, and may transmit a PUSCH according to UL TCI state 1 (or spatial relationship information 1) in PUSCH TO 3.

In the above example, a UE transmits a rank 2 PUSCH using PMI 1, PMI 2, PMI 1, and PMI 2 in PUSCH TO 1, 2, 3, and 4, respectively. However, since data reliability may be lowered due to inter-layer interference that occurs when transmitting rank 2 or higher, it may not be suitable for the MTRP PUSCH transmission method that increases reliability by repeatedly/dividing PUSCH transmission to several TOs.

Table 13 illustrates a precoder applied for each PUSCH transmission occasion (TO).

TABLE 13

| PUSCH TO | Precoder | PUSCH rank |
|---|---|---|
| 1 | PMI 1 | 2 |
| 2 | PMI 2 | 2 |
| 3 | PMI 1 | 2 |
| 4 | PMI 2 | 2 |

In order to solve the above-mentioned problem 2, when a PUSCH precoder of each TRP indicated by DCI is rank I (e.g., rank 2) or higher, instead of performing I-layer transmission by applying a rank I precoder to each PUSCH TO, a method of sequentially applying the first (1st) layer precoder, the second (2nd) layer precoder, . . . , I-th layer precoder of the rank I precoder one by one and transmitting them as a single layer.

For example, when rank 2 PMI 1 and rank 2 PMI 2 are indicated and 4 PUSCH TOs are configured so that a PUSCH is transmitted in PUSCH TOs 1, 2, 3, and 4 to with TRPs 0, 1, 0, and 1, respectively (i.e., when a UL beam is generated with UL TCI state 0, 1, 0, 1 or spatial relation RS 0, 1, 0, 1 or related CSIRS 0, 1, 0, 1 in PUSCH TO 1, 2, 3, 4, respectively), table 14 below and the proposed method may be applied.

That is, PUSCH TOs 1 and 3 may be grouped into one PUSCH TO group, and PUSCH TOs 2 and 4 may be grouped into another PUSCH TO group. In this case, a precoding vector for a single layer may be applied to PUSCH transmitted in each TO group for each TO. Here, precoding vectors for a single layer may be sequentially and circularly used within a corresponding precoding vector group.

Here, for convenience of description, a case in which the number of TOs is four has been assumed, but the present disclosure is not limited thereto. Even if there are four or more TOs, single-layer precoders constituting rank 1 precoders can be sequentially and circularly applied from the first layer precoder during PUSCH transmission in each PUSCH TO.

For example, a first layer precoder among PMIs of precoders corresponding to each TRP is sequentially applied to a PUSCH TO (i.e., in order of TRPs), the second layer precoder among PMIs of the precoders corresponding to each TRP, may be applied in the following order.

TABLE 14

| PUSCH TO | Precoder | PUSCH rank |
|---|---|---|
| 1 | First layer precoder for PMI 1 | 1 |
| 2 | First layer precoder for PMI 2 | 1 |
| 3 | Second layer precoder for PMI 1 | 1 |
| 4 | Second layer precoder for PMI 2 | 1 |

In Table 14, PMI 1 may be interpreted as Group 0 in Embodiments 1-1 and 1-2, and PMI 2 may be interpreted as Group 1. In this case, as described above, a PMI value for each TRP may be indicated by one TPMI field, precoding matrices according to the indicated TPMI field values are divided into groups 0 and 1, and single-layer precoders can be sequentially selected in each group.

In the above description, codebook-based UL PUSCH transmission has been described as an example, but the proposed method may be extended and applied to a non-codebook based method in which a PMI is not directly indicated and a precoded SRS port is indicated. In this case, the number of SRS ports of each TRP configured through an SRI in DCI is I (e.g., 2) or more, instead of performing I-layer transmission using the precoder applied to the I port SRS for each PUSCH TO, a method of transmitting the PUSCH in a single layer by sequentially applying the precoder applied to the first port, the precoder applied to the second port, . . . , the precoder applied to I-th port of the I port SRS one by one is proposed.

For example, it is assumed that two 1-port SRS resources (e.g., SRS resources 0 and 1) are indicated for PUSCH transmission of TRP 0 (i.e., this is the same as a 2-port SRS indicated according to the codebook-based transmission method) and two 1-port SRS resources (e.g., SRS resources 2 and 3) are indicated for PUSCH transmission of TRP 1. In addition, if four PUSCH TOs are configured and PUSCH transmission is performed to TRPs 0, 1, 0, and 1 in PUSCH TOs 1, 2, 3, and 4, respectively (i.e., when a UL beam is generated with UL TCI states 0, 1, 0, 1 or spatial relation RS 0, 1, 0, 1 or related CSIRS 0, 1, 0, 1 in PUSCH TO 1, 2, 3, 4, respectively), the proposed method is applied as shown in Table 15 below.

For example, when transmitting PUSCH, a UE may sequentially apply a precoder applied to a port of the first SRS resource among SRS resources corresponding to each TRP to a PUSCH TO sequentially (i.e., in the order of TRPs) and may apply a precoder applied to a port of the second SRS resource among SRS resources corresponding to each TRP in the following order.

TABLE 15

| PUSCH TO | Precoder | PUSCH rank |
|---|---|---|
| 1 | Precoder applied to the port of SRS resource 0 | 1 |
| 2 | Precoder applied to the port of SRS resource 2 | 1 |
| 3 | Precoder applied to the port of SRS resource 1 | 1 |
| 4 | Precoder applied to the port of SRS resource 3 | 1 |

Although a rank of each PUSCH TO is limited to 1 for convenience of description in the above-described embodiment 2, transmission of rank 2 for each PUSCH TO is also possible by applying the proposed method. For example, if the indicated PMIs 1 and 2 are rank 4, a UE may assume/consider the first layer precoder and the second layer precoder of a PMI as 'the first rank 2 precoder'. In addition, a UE may assume/consider the third layer precoder and the fourth layer precoder as 'the first rank 2 precoder', In addition, a UE may sequentially apply the 'first rank 2 precoder' and the 'second rank 2 precoder' to each PUSCH TO.

Here, the number of layers to be applied to each PUSCH TO (according to the indicated transmission rank indicator (TRI)) may be defined by a specific rule (e.g., (TRI indication value)/2 layer(s) for each PUSCH TO). Alternatively, a base station may separately configure/designate a value of the number of layers to be applied to each PUSCH TO to a UE.

Problem 3: When a precoding vector (e.g., precoding vector group 0) used in PUSCH TO of TRP 0 and a precoding vector (e.g., precoding vector group 1) used in PUSCH TO of TRP 1 are divided, additional issues may occur in relation to PUSCH power control (e.g., Example 1-1).

Embodiment 3: For example, when an entry 6 (i.e., TPMI index=6) is indicated in the partial-coherent codebook of Table 10, in PUSCH TO of TRP0, port 1 and port 3 are muted, so data (i.e., PUSCH) transmission is performed using port 0 and port 2. Here, (assuming that the sum of the transmission power of all antennas is 1), a UE may report to a base station whether or not it can draw and use power of muted ports 1 and 3 for port 0 and port 2 that are not muted, as UE capability.

If a UE can redistribute and transmit the sum of all antenna transmit powers only to unmuted antenna ports, the UE can redistribute ¼ power that can be allocated to ports 1 and 3, respectively, to the remaining ports that are not muted. Therefore, ¼ of the power allocated to ports 0 and 2 is added to ¼ of the power redistributed from powers 1 and 3, and as a result, ½ of the power can be distributed to ports 0 and 2, respectively. All ports that are not muted can use the full power of 1. In the same way, ½ power can be distributed to each of ports 1 and 3 in the PUSCH TO of TRP1.

Similarly, in the rank 3 and rank 4 codebooks, power of a zero power port may be derived from each PUSCH TO and additionally allocated to a non-zero power port. In this case, since multi-ranks can be transmitted in each PUSCH TO, each layer is transmitted by equally splitting the power allocated to the port in each PUSCH TO.

If, in the example above, a UE cannot redistribute the sum of all antennas transmit powers to only non-muted ports (i.e., it is not supported by UE capabilities), ¼ power is distributed to each port. That is, ¼ power may be distributed to each of ports 0 and 2 for PUSCH TO of TRP0, and ¼ power may be distributed to each of ports 1 and 3 for-PUSCH TO of TRP1.

Figure 8:
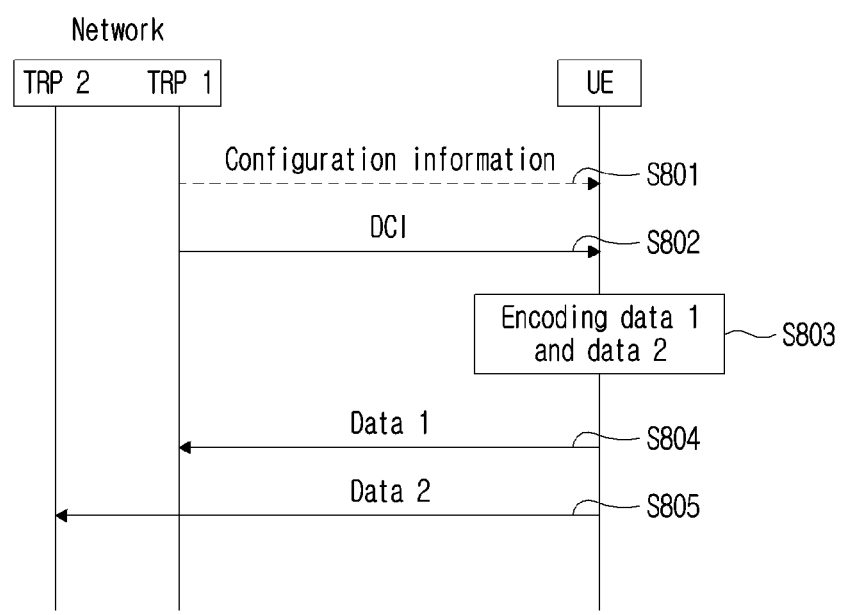
FIG. 8 illustrates a signaling procedure between a network and a terminal according to an embodiment of the present disclosure.

FIG. 8 illustrates a signaling procedure between a network and a terminal according to an embodiment of the present disclosure.

FIG. 8 to be described later exemplifies signaling between a network (e.g., TRP 1 and TRP 2) and a terminal (i.e., UE) in a situation of multiple TRPs (i.e., M-TRP, or multiple cells, below all TRPs can be replaced with cells) to which the methods (e.g., Embodiment 1/Embodiment 1-1/Embodiment 1-2/Embodiment 2/Embodiment 3, etc.) proposed in the present disclosure can be applied.

Here, UE/Network is only an example, and may be applied to various devices as described in FIG. 11 to be described later. FIG. 8 is only for convenience of description and does not limit the scope of the present disclosure. In addition, some step(s) shown in FIG. 8 may be omitted depending on circumstances and/or configurations.

Referring to FIG. 8, signaling between two TRPs and a UE is considered for convenience of explanation, but the corresponding signaling method may be extended and applied to signaling between multiple TRPs and multiple UEs. In the following description, a network may be one base station including a plurality of TRPs, and may be one cell including a plurality of TRPs. For example, an ideal/non-ideal backhaul may be configured between TRP 1 and TRP 2 constituting the Network. In addition, although the following description is based on a plurality of TRPs, it can be equally extended and applied to transmission through a plurality of panels. In addition, in the present disclosure, the operation of a UE receiving a signal from TRP1/TRP2 can be interpreted/described as (or it can be an operation) an operation of a terminal receiving a signal from a network (through/using TRP1/2), the operation of a UE transmitting a signal to TRP1/TRP2 can be interpreted/explained as (or it can be an operation) an operation of a terminal transmitting a signal (through/using TRP1/TRP2) to a network, and vice versa.

In addition, as described above, "TRP" may be replaced with expressions such as a panel, an antenna array, and a cell (e.g., macro cell/small cell/pico cell, etc.), a transmission point (TP), a base station (base station, gNB, etc.). As described above, TRPs may be classified according to information (e.g., an index, an identifier (ID)) of a CORESET group (or CORESET pool). For example, when one UE is configured to transmit/receive with multiple TRPs (or cells), this may mean that multiple CORESET groups (or CORESET pools) are configured for one UE. Configuration of such a CORESET group (or CORESET pool) may be performed through higher layer signaling (e.g., RRC signaling, etc.). In addition, a base station may mean a generic term for an object that transmits and receives data with a UE. For example, a base station may be a concept including one or more transmission points (TPs), one or more transmission and reception points (TRPs), etc. Also, a TP and/or a TRP may include a panel of a base station, a transmission and reception unit, etc.

Specifically, FIG. 8 illustrates signaling when a UE receives single DCI (i.e., when one TRP transmits DCI to a UE) in an M-TRP (or cell, all TRP below can be replaced with cell/panel, or even if multiple CORESET (/CORESET group) is configured from one TRP, it can be assumed to be M-TRP) situation. In FIG. 8, it is assumed that DCI is transmitted as a representative of TRP1 for convenience of description. FIG. 8 is only an example for convenience of description, and does not limit the technical scope of the present disclosure. Therefore, it can be applied even when a UE receives multiple DCI (i.e., when a network transmits DCI to a UE through/using each TRP).

Although not shown in FIG. 8, a UE may transmit UE capability to a network through/using TRP1 (and/or TRP2). A UE capability may include capability information of the UE related to an operation of the UE. A network may perform configurations supportable by a UE based on the UE capability. For example, as described in the above-described Embodiment 3, capability information on whether a UE can use the power of a muted port in an unmuted port can be transmitted through the UE capability. A network may configure power suitable for a UE based on power-related capability information.

A UE may receive configuration information related to multiple TRP-based transmission and reception through/using TRP 1 (and/or TRP 2) from a network (S801). The configuration information may include information related to network configuration (i.e., TRP configuration)/resource allocation related to transmission and reception based on multiple TRPs. In this case, the configuration information may be transmitted through higher layer signaling (e.g., RRC signaling, MAC control information (CE), etc.). In addition, when the configuration information is defined or configured in advance, the corresponding step may be omitted.

For example, the configuration information may include configuration information related to MTRP transmission described in the above-described proposed methods (e.g., Embodiment 1/Embodiment 1-1/Embodiment 1-2/Embodiment 2/Embodiment 3, etc.). For example, the configuration information may include configuration information for CORESET/CORESET group (or pool) related to the network (e.g., TRP 1/TRP 2)/TCI state related configuration information associated with each TRP (or spatial relationship information associated with each TRP), etc.

For example, the configuration information may include SRS resource-related configuration (e.g., SRS resource set/SRS resource/SRS resource type/related CSI-RS, etc.)/a usage related to an SRS resource (e.g., codebook based/non-codebook based/antenna switching/beam management, etc.)/configuration for uplink channel transmission (e.g., configuration for a PUSCH serving cell (PUSCH-serving-cellconfig)/configuration related to the maximum number of MIMO layers (maxMIMO-layer), etc.)/codebook subset (codebooksubset)/maximum rank (maxrank), etc. described in the above-described proposed methods (e.g., Embodiment 1/Embodiment 1-1/Embodiment 1-2/Embodiment 2/Embodiment 3, etc.).

In addition, the configuration information may include multiple uplink TCI states (i.e., information on multiple reference signals having a QCL relationship with a DMRS of a PUSCH) or multiple spatial relation information (i.e., information on multiple spatial relation reference signals) for uplink (i.e., PUSCH) transmission to multiple TRPs. PUSCH transmission to each TRP may correspond to each TCI state or each spatial relationship information. That is, in the case of two TRP transmissions, a UE may transmit a PUSCH at a first transmission time occasion(s) (TO) (i.e., a TO group including one or more TOs) among a plurality of total transmission time occasions (TOs) based on a first TCI state or a first spatial relation information, and the UE may transmit a PUSCH at a second transmission time occasion(s) (TO) (i.e., a TO group including one or more TOs) among a plurality of total transmission time occasions (TOs) based on a second TCI state or a second spatial relation information.

A UE may receive DCI from a network through/using TRP 1 (S802). The DCI may be transmitted through a control channel (e.g., PDCCH, etc.). As described above, it is assumed the case of single DCI reception where TRP 1 transmits DCI as a representative, but in some cases, the proposed methods of the present disclosure can be applied even in the case of multiple DCI reception from each TRP. For example, the DCI may include (indication) information on a TCI state (e.g., TCI field)/resource allocation information on the TCI state (e.g., bandwidth)/resource allocation information (i.e., spatial/frequency/time resource) on a data channel (e.g., PDSCH/PUSCH), etc.

For example, as described in the above proposed methods (e.g., Embodiment 1/Embodiment 1-1/Embodiment 1-2/Embodiment 2/Embodiment 3, etc.), the DCI may include an SRI field/a precoding information and number of layers field (or TPMI field).

The UE may determine a PUSCH transmission precoder based on an SRS resource indicator (SRI), a transmission precoding matrix indicator (TPMI), and a transmission rank. Here, an SRI, a TPMI, and a transmission rank may be given by an SRS resource indicator field and a precoding information and number of layers field in DCI, respectively.

In addition, one of 2 (or 4) SRS resources defined in one SRS resource set is indicated through a 1 (or 2) bit SRI field of DCI. Although not shown in FIG. 8, before a PDCCH carrying DCI of a UE, the UE may transmit an SRS to a network. In addition, an SRI indicated in slot n by DCI is related to the most recent transmission of an SRS resource identified by the SRI (i.e., the most recent prior to a PDCCH carrying the corresponding DCI).

In this way, a UE may apply a specific precoding matrix indicated from a predetermined codebook according to a TPMI and a transmission rank (i.e., given by a Precoding information and number of layers field) given by DCI to an antenna port of an SRS resource selected (indicated) by an SRI field in DCI and transmit a PUSCH to a network.

For example, a precoding vector indicated/configured by a TPMI in DCI may be divided into a plurality of groups (e.g., group 0/group 1) based on a predefined rule, and each group may be applied to PUSCH TO of each TRP. For example, the predefined rule may be determined based on a codebook subset configuration (e.g., partial coherent/non-coherent, etc.). The predefined rule may be based on the methods described in Embodiment 1/Embodiment 1-1/Embodiment 1-2 described above.

A UE may encode data 1 and data 2 (S803). For example, based on the above proposed methods (e.g., Embodiment 1/Embodiment 1-1/Embodiment, 1-2/Embodiment 2/Embodiment 3, etc.), a UE can encode the data 1/the data 2.

A UE may transmit data 1 to a network through/using TRP 1 (S804). In addition, a UE may transmit data 2 to a network through/using TRP 2 (S805). For example, the data 1 and/or the data 2 may be transmitted through an uplink channel (e.g., PUSCH). For example, the data 1 and/or the data 2 may be transmitted based on the configuration information/DCI of steps S801 and/or S802 described above. For example, the data 1 and/or the data 2 may be transmitted by applying a rank/precoder (or beam) based on information configured based on the above-described proposed methods (e.g., Embodiment 1/Embodiment 1-1/Embodiment 1-2/Embodiment 2/Embodiment 3, etc.).

Data 1 and Data 2 may be transmitted to different TRPs, respectively, and may be collectively referred to as PUSCH transmission without distinction of TRPs.

A PUSCH may be transmitted on a plurality of transmission occasions (TOs). Here, a plurality of transmission occasions can be divided into N TO groups (i.e., each TO group includes one or more TOs) corresponding to each TRP, and different uplink TCI states or spatial relationship information may be used for PUSCH transmission for each TO group.

Also, according to the above-described proposed methods (e.g., Embodiment 1/Embodiment 1-1/Embodiment 1-2/Embodiment 2/Embodiment 3, etc.), a PUSCH transmitted in each TO group may be transmitted based on a precoding vector group associated with a TO group in which the PUSCH is transmitted.

Here, a precoding vector group may be determined as one or more precoding vectors (i.e., column vectors and/or row vectors) constituting a precoding matrix determined according to a TPMI and/or a transmission rank.

Here, a precoding vector group may be determined as one or more precoding vectors among precoding vectors for each layer constituting the precoding matrix. For example, in the case of PUSCH transmission of rank 4 toward 2 TRP, a precoding vector group applied to a PUSCH (transmission to a first TRP or transmission according to a first UL TCI state or transmission according to first spatial relationship information) transmitted in a first TO group is determined as the first column vector (i.e., a column vector for the first layer) and the second column vector (i.e., a column vector for the second layer). Similarly, a precoding vector group applied to a PUSCH (transmission to a second TRP or transmission according to a second UL TCI state or transmission according to second spatial relationship information) transmitted in a second TO group is determined as the third column vector (i.e., a column vector for the third layer) and the fourth column vector (i.e., a column vector for the fourth layer).

In addition, for example, a first precoding vector group applied to a PUSCH (transmission to a first TRP or transmission according to a first UL TCI state or transmission according to a first spatial relation information) transmitted in a first TO group may be determined as a precoding vector for the ceil(transmission rank indicated by DCI/2)th layer (ceil(x) is the smallest integer not less than x) from a precoding vector for the first layer. In addition, a second precoding vector group applied to a PUSCH (transmission to a second TRP or transmission according to a second UL TCI state or transmission according to a second spatial relation information) transmitted in a second TO group may be determined as precoding vectors for the remaining layers.

In addition, a precoding vector group may be determined as one or more precoding vectors in which an element for a predetermined antenna port has a non-zero value among precoding vectors for each layer constituting the precoding matrix. For example, in the case of 4Tx PUSCH transmission toward 2 TRPs, a precoding vector group applied to a PUSCH (transmission to a first TRP or transmission according to a first UL TCI state or transmission according to a first spatial relation information) transmitted in a first TO group is composed of column vectors having non-zero values in the first and third row elements (i.e., elements for the first and third antenna ports). Similarly, a precoding vector group applied to a PUSCH (transmission to a second TRP or transmission according to a second UL TCI state or transmission according to a second spatial relation information) transmitted in a second TO group may be composed of column vectors having non-zero values in the second and fourth row elements (i.e., elements for the second and fourth antenna ports).

In addition, a precoding vector group may be determined as precoding vectors for all layers in a precoding matrix in which elements for some antenna ports in the precoding matrix are reset to 0. For example, in the case of 4Tx PUSCH transmission toward 2 TRPs, the first precoding vector group applied to a PUSCH (transmission to a first TRP or transmission according to a first UL TCI state or transmission according to a first spatial relation information) transmitted in a first TO group may be composed of all column vectors (i.e., precoding vectors for all layers) in a precoding vector in which the first and second row elements (i.e. elements for the first and second antenna ports) in a precoding matrix indicated by DCI are reset to 0. In addition, a second precoding vector group applied to a PUSCH (transmission to a second TRP or transmission according to a second UL TCI state or transmission according to a second spatial relation information) transmitted in a second TO group may be composed of all column vectors (i.e., precoding vectors for all layers) in a precoding vector in which the third and fourth row elements (i.e. elements for the third and fourth antenna ports) in a precoding matrix indicated by DCI are reset to 0.

In addition, when a transmission rank for a PUSCH is 2, a precoding vector group may be determined as a precoding vector for the first layer in which elements for some antenna ports and a precoding vector for the second layer in which elements for the remaining antenna ports are reset to 0 in the precoding matrix. That is, elements reset to 0 for each layer may not overlap. For example, a precoding vector group applied to a PUSCH (transmission to a second TRP or transmission according to a second UL TCI state or transmission according to a second spatial relation information) transmitted to a specific TO group may be composed of a first column vector (i.e., a precoding vector for the first layer) in which the first and second row elements (i.e., row elements for the first and second antenna ports) are reset to 0, and a second column vector (i.e., a precoding vector for the second layer) in which the third and fourth row elements (i.e., row elements for the third and fourth antenna ports) are reset to 0.

In addition, in each TO, the PUSCH may be transmitted based on a precoding vector for a single layer in a precoding vector group associated with a TO group in which the PUSCH is transmitted. Here, the precoding vector for a single layer for each TO in which the PUSCH is transmitted within the TO group may be sequentially and circularly applied within the precoding vector group. For example, a PUSCH may be transmitted in a single layer by dividing two or more rank 1 precoder into precoders for each layer and sequentially applying them to PUSCH TO. As another example, in the case of PUSCH transmission toward 2 TRPs, the first precoding vector group applied to a PUSCH (transmission to a first TRP or transmission according to a first UL TCI state or transmission according to a first spatial relation information) transmitted in a first TO group may be composed of the first and second column vectors (i.e., precoding vectors for the first and second layers) in a precoding matrix indicated by DCI. Here, first and second column vectors may be alternately applied, for each TO, to a PUSCH transmitted in a first TO group. In addition, the second precoding vector group applied to a PUSCH (transmission to a second TRP or transmission according to a second UL TCI state or transmission according to a second spatial relation information) transmitted in a second TO group may be composed of the third and fourth column vectors (i.e., precoding vectors for the third and fourth layers) in a precoding matrix indicated by DCI. Here, third and fourth column vectors may be alternately applied, for each TO, to a PUSCH transmitted in a second TO group.

In addition, power for all antenna ports of the precoding matrix may be equally distributed to antenna ports corresponding to non-zero elements in the precoding vector group for power control of the PUSCH. For example, a UE may transmit the data 1 and/or the data 2 by distributing power for each port/rank based on the method of Embodiment 3 described above.

Figure 9:
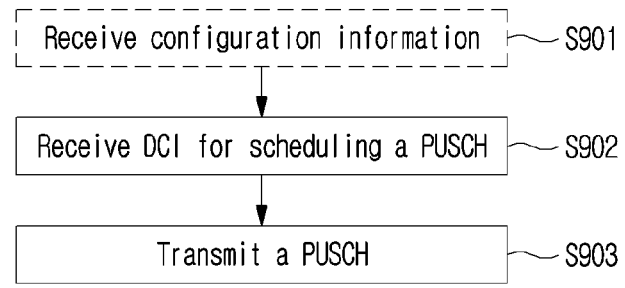
FIG. 9 illustrates an operation of a terminal for transmitting and receiving a PUSCH according to an embodiment of the present disclosure.

FIG. 9 illustrates an operation of a terminal for transmitting and receiving a PUSCH according to an embodiment of the present disclosure.

FIG. 9 illustrates an operation of a terminal based on the previously proposed methods (e.g., Embodiment 1/Embodiment 1-1/Embodiment 1-2/Embodiment 2/Embodiment 3, etc.). Some step(s) shown in FIG. 9 may be omitted depending on circumstances and/or configurations. In addition, a terminal in FIG. 9 is only one example, and may be implemented as a device illustrated in FIG. 11 below. For example, the processor (102/202) of FIG. 9 may control to transmit/receive channels/signals/data/information, etc. using the transceiver (106/206), and may control to store transmitted or received channels/signals/data/information, etc. in the memory (104/204).

Figure 11:
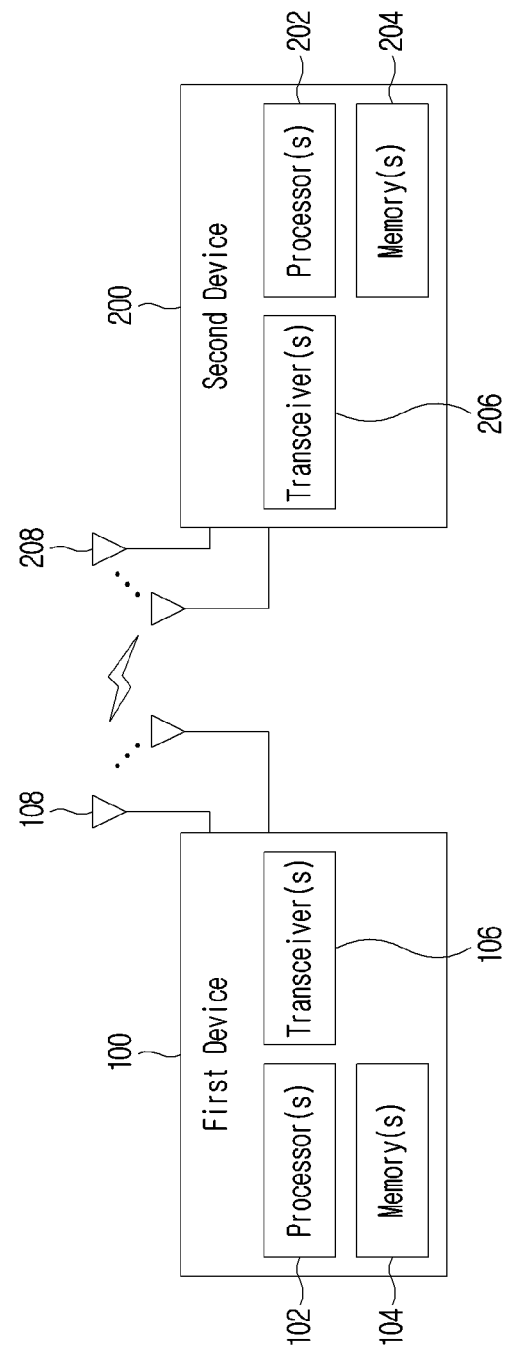
FIG. 11 illustrates a block diagram of a wireless communication device according to an embodiment of the present disclosure.

Additionally, an operation of FIG. 9 may be processed by one or more processors (102, 202) of FIG. 11. In addition, an operation of FIG. 9 may be stored in a memory (e.g., one or more memories (104, 204) of FIG. 11) in a form of instructions/programs (e.g., instructions, executable codes) for driving at least one processor (e.g., 102, 202) of FIG. 11.

Referring to FIG. 9, for convenience of description, an operation of a terminal for one base station (i.e., one TRP) is considered, but an operation of a terminal can be extended and applied to an operation between multiple TRPs as well.

Although not shown in FIG. 9, a terminal may transmit terminal capability to a base station. The capability may include capability information of a terminal related to an operation of the terminal. A base station may perform configurations supportable by a terminal based on the capability. For example, as described in the above-described Embodiment 3, capability information on whether a terminal can use the power of a muted port in an unmuted port can be transmitted through the capability. A base station may configure power suitable for a terminal based on power-related capability information.

A terminal may receive configuration information related to multiple TRP-based transmission and reception from a base station (S901). The configuration information may include information related to network configuration (i.e., TRP configuration)/resource allocation related to transmission and reception based on multiple TRPs. In this case, the configuration information may be transmitted through higher layer signaling (e.g., RRC signaling, MAC control information (CE), etc.). In addition, when the configuration information is defined or configured in advance, the corresponding step may be omitted.

For example, the configuration information may include configuration information related to MTRP transmission described in the above-described proposed methods (e.g., Embodiment 1/Embodiment 1-1/Embodiment 1-2/Embodiment 2/Embodiment 3, etc.). For example, the configuration information may include configuration information for CORESET/CORESET group (or pool) related to the base station/TCI state related configuration information associated with each TRP (or spatial relationship information associated with each TRP), etc.

For example, the configuration information may include SRS resource-related configuration (e.g., SRS resource set/ SRS resource/SRS resource type/related CSI-RS, etc.)/a usage related to an SRS resource (e.g., codebook based/non-codebook based/antenna switching/beam management, etc.)/configuration for uplink channel transmission (e.g., configuration for a PUSCH serving cell (PUSCH-serving-cellconfig)/configuration related to the maximum number of MIMO layers (maxMIMO-layer), etc.)/codebook subset (codebooksubset)/maximum rank (maxrank), etc. described in the above-described proposed methods (e.g., Embodiment 1/Embodiment 1-1/Embodiment 1-2/Embodiment 2/Embodiment 3, etc.).

In addition, the configuration information may include multiple uplink TCI states (i.e., information on multiple reference signals having a QCL relationship with a DMRS of a PUSCH) or multiple spatial relation information (i.e., information on multiple spatial relation reference signals) for uplink (i.e., PUSCH) transmission to multiple TRPs. PUSCH transmission to each TRP may correspond to each TCI state or each spatial relationship information. That is, in the case of two TRP transmissions, a terminal may transmit a PUSCH at a first transmission time occasion(s) (TO) (i.e., a TO group including one or more TOs) among a plurality of total transmission time occasions (TOs) based on a first TCI state or a first spatial relation information, and the terminal may transmit a PUSCH at a second transmission time occasion(s) (TO) (i.e., a TO group including one or more TOs) among a plurality of total transmission time occasions (TOs) based on a second TCI state or a second spatial relation information.

A terminal may receive DCI for scheduling a PUSCH from a base station (S902). The DCI may be transmitted through a control channel (e.g., PDCCH, etc.).

Here, the DCI may include (indication) information on a TCI state (e.g., TCI field)/resource allocation information on the TCI state (e.g., bandwidth)/resource allocation information (i.e., spatial/frequency/time resource) on a data channel (e.g., PDSCH/PUSCH), etc.

For example, as described in the above proposed methods (e.g., Embodiment 1/Embodiment 1-1/Embodiment 1-2/ Embodiment 2/Embodiment 3, etc.), the DCI may include an SRI field/a precoding information and number of layers field (or TPMI field).

A terminal may determine a PUSCH transmission precoder based on an SRS resource indicator (SRI), a transmission precoding matrix indicator (TPMI), and a transmission rank. Here, an SRI, a TPMI, and a transmission rank may be given by an SRS resource indicator field and a precoding information and number of layers field in DCI, respectively.

In addition, one of 2 (or 4) SRS resources defined in one SRS resource set is indicated through a 1 (or 2) bit SRI field of DCI. Although not shown in FIG. 9, before a PDCCH carrying DCI of a terminal, the terminal may transmit an SRS to a network. In addition, an SRI indicated in slot n by DCI is related to the most recent transmission of an SRS resource identified by the SRI (i.e., the most recent prior to a PDCCH carrying the corresponding DCI).

In this way, a terminal may apply a specific precoding matrix indicated from a predetermined codebook according to a TPMI and a transmission rank (i.e., given by a Precoding information and number of layers field) given by DCI to an antenna port of an SRS resource selected (indicated) by an SRI field in DCI and transmit a PUSCH to a network.

For example, a precoding vector indicated/configured by a TPMI in DCI may be divided into a plurality of groups (e.g., group 0/group 1) based on a predefined rule, and each group may be applied to PUSCH TO of each TRP. For example, the predefined rule may be determined based on a codebook subset configuration (e.g., partial coherent/non-coherent, etc.). The predefined rule may be based on the methods described in Embodiment 1/Embodiment 1-1/Embodiment 1-2 described above.

A terminal transmits a PUSCH to a base station based on DCI (S903).

Here, the PUSCH may be transmitted by applying a rank/precoder (or beam) based on information configured based on the above-described proposed methods (e.g., Embodiment 1/Embodiment 1-1/Embodiment 1-2/Embodiment 2/Embodiment 3, etc.).

A PUSCH may be transmitted on a plurality of transmission occasions (TOs). Here, a plurality of transmission occasions can be divided into N TO groups (i.e., each TO group includes one or more TOs) corresponding to each TRP, and different uplink TCI states or spatial relationship information may be used for PUSCH transmission for each TO group.

Also, according to the above-described proposed methods (e.g., Embodiment 1/Embodiment 1-1/Embodiment 1-2/

Embodiment 2/Embodiment 3, etc.), a PUSCH transmitted in each TO group may be transmitted based on a precoding vector group associated with a TO group in which the PUSCH is transmitted.

Here, a precoding vector group may be determined as one or more precoding vectors (i.e., column vectors and/or row vectors) constituting a precoding matrix determined according to a TPMI and/or a transmission rank.

Here, a precoding vector group may be determined as one or more precoding vectors among precoding vectors for each layer constituting the precoding matrix. For example, in the case of PUSCH transmission of rank 4 toward 2 TRP, a precoding vector group applied to a PUSCH (transmission to a first TRP or transmission according to a first UL TCI state or transmission according to first spatial relationship information) transmitted in a first TO group is determined as the first column vector (i.e., a column vector for the first layer) and the second column vector (i.e., a column vector for the second layer). Similarly, a precoding vector group applied to a PUSCH (transmission to a second TRP or transmission according to a second UL TCI state or transmission according to second spatial relationship information) transmitted in a second TO group is determined as the third column vector (i.e., a column vector for the third layer) and the fourth column vector (i.e., a column vector for the fourth layer).

In addition, for example, a first precoding vector group applied to a PUSCH (transmission to a first TRP or transmission according to a first UL TCI state or transmission according to a first spatial relation information) transmitted in a first TO group may be determined as a precoding vector for the ceil(transmission rank indicated by DCI/2)th layer (ceil(x) is the smallest integer not less than x) from a precoding vector for the first layer. In addition, a second precoding vector group applied to a PUSCH (transmission to a second TRP or transmission according to a second UL TCI state or transmission according to a second spatial relation information) transmitted in a second TO group may be determined as precoding vectors for the remaining layers.

In addition, a precoding vector group may be determined as one or more precoding vectors in which an element for a predetermined antenna port has a non-zero value among precoding vectors for each layer constituting the precoding matrix. For example, in the case of 4Tx PUSCH transmission toward 2 TRPs, a precoding vector group applied to a PUSCH (transmission to a first TRP or transmission according to a first UL TCI state or transmission according to a first spatial relation information) transmitted in a first TO group is composed of column vectors having non-zero values in the first and third row elements (i.e., elements for the first and third antenna ports). Similarly, a precoding vector group applied to a PUSCH (transmission to a second TRP or transmission according to a second UL TCI state or transmission according to a second spatial relation information) transmitted in a second TO group may be composed of column vectors having non-zero values in the second and fourth row elements (i.e., elements for the second and fourth antenna ports).

In addition, a precoding vector group may be determined as precoding vectors for all layers in a precoding matrix in which elements for some antenna ports in the precoding matrix are reset to 0. For example, in the case of 4Tx PUSCH transmission toward 2 TRPs, the first precoding vector group applied to a PUSCH (transmission to a first TRP or transmission according to a first UL TCI state or transmission according to a first spatial relation information) transmitted in a first TO group may be composed of all column vectors (i.e., precoding vectors for all layers) in a precoding vector in which the first and second row elements (i.e. elements for the first and second antenna ports) in a precoding matrix indicated by DCI are reset to 0. In addition, a second precoding vector group applied to a PUSCH (transmission to a second TRP or transmission according to a second UL TCI state or transmission according to a second spatial relation information) transmitted in a second TO group may be composed of all column vectors (i.e., precoding vectors for all layers) in a precoding vector in which the third and fourth row elements (i.e. elements for the third and fourth antenna ports) in a precoding matrix indicated by DCI are reset to 0.

In addition, when a transmission rank for a PUSCH is 2, a precoding vector group may be determined as a precoding vector for the first layer in which elements for some antenna ports and a precoding vector for the second layer in which elements for the remaining antenna ports are reset to 0 in the precoding matrix. That is, elements reset to 0 for each layer may not overlap. For example, a precoding vector group applied to a PUSCH (transmission to a second TRP or transmission according to a second UL TCI state or transmission according to a second spatial relation information) transmitted to a specific TO group may be composed of a first column vector (i.e., a precoding vector for the first layer) in which the first and second row elements (i.e., row elements for the first and second antenna ports) are reset to 0, and a second column vector (i.e., a precoding vector for the second layer) in which the third and fourth row elements (i.e., row elements for the third and fourth antenna ports) are reset to 0.

In addition, in each TO, the PUSCH may be transmitted based on a precoding vector for a single layer in a precoding vector group associated with a TO group in which the PUSCH is transmitted. Here, the precoding vector for a single layer for each TO in which the PUSCH is transmitted within the TO group may be sequentially and circularly applied within the precoding vector group. For example, a PUSCH may be transmitted in a single layer by dividing two or more rank I precoder into precoders for each layer and sequentially applying them to PUSCH TO. As another example, in the case of PUSCH transmission toward 2 TRPs, the first precoding vector group applied to a PUSCH (transmission to a first TRP or transmission according to a first UL TCI state or transmission according to a first spatial relation information) transmitted in a first TO group may be composed of the first and second column vectors (i.e., precoding vectors for the first and second layers) in a precoding matrix indicated by DCI. Here, first and second column vectors may be alternately applied, for each TO, to a PUSCH transmitted in a first TO group. In addition, the second precoding vector group applied to a PUSCH (transmission to a second TRP or transmission according to a second UL TCI state or transmission according to a second spatial relation information) transmitted in a second TO group may be composed of the third and fourth column vectors (i.e., precoding vectors for the third and fourth layers) in a precoding matrix indicated by DCI. Here, third and fourth column vectors may be alternately applied, for each TO, to a PUSCH transmitted in a second TO group.

In addition, power for all antenna ports of the precoding matrix may be equally distributed to antenna ports corresponding to non-zero elements in the precoding vector group for power control of the PUSCH. For example, a terminal may transmit the PUSCH by distributing power for each port/rank based on the method of Embodiment 3 described above.

Figure 10:
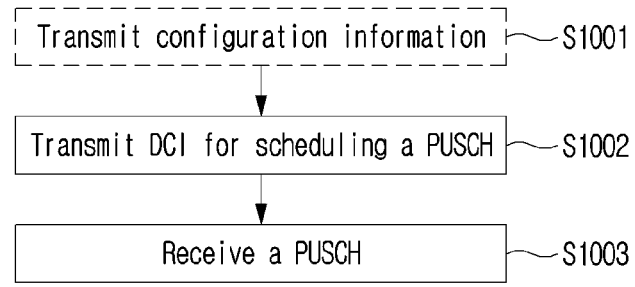
FIG. 10 illustrates an operation of a terminal for transmitting and receiving a PUSCH according to an embodiment of the present disclosure.

FIG. 10 illustrates an operation of a terminal for transmitting and receiving a PUSCH according to an embodiment of the present disclosure.

FIG. 10 illustrates an operation of a base station based on the previously proposed methods (e.g., Embodiment 1/Embodiment 1-1/Embodiment 1-2/Embodiment 2/Embodiment 3, etc.). Some step(s) shown in FIG. 10 may be omitted depending on circumstances and/or configurations. In addition, a base station in FIG. 10 is only one example, and may be implemented as a device illustrated in FIG. 11 below. For example, the processor (102/202) of FIG. 10 may control to transmit/receive channels/signals/data/information, etc. using the transceiver (106/206), and may control to store transmitted or received channels/signals/data/information, etc. in the memory (104/204).

Additionally, an operation of FIG. 10 may be processed by one or more processors (102, 202) of FIG. 11. In addition, an operation of FIG. 10 may be stored in a memory (e.g., one or more memories (104, 204) of FIG. 11) in a form of instructions/programs (e.g., instructions, executable codes) for driving at least one processor (e.g., 102, 202) of FIG. 11.

Referring to FIG. 10, for convenience of description, an operation of one base station (i.e., one TRP) is considered, but an operation of a base station can be extended and applied to an operation between multiple TRPs as well.

Although not shown in FIG. 10, a base station may receive terminal capability from a terminal. The capability may include capability information of a terminal related to an operation of the terminal. A base station may perform configurations supportable by a terminal based on the capability. For example, as described in the above-described Embodiment 3, capability information on whether a terminal can use the power of a muted port in an unmuted port can be transmitted through the capability. A base station may configure power suitable for a terminal based on power-related capability information.

A base station may transmit configuration information related to multiple TRP-based transmission and reception to a terminal (S1001). The configuration information may include information related to network configuration (i.e., TRP configuration)/resource allocation related to transmission and reception based on multiple TRPs. In this case, the configuration information may be transmitted through higher layer signaling (e.g., RRC signaling, MAC control information (CE), etc.). In addition, when the configuration information is defined or configured in advance, the corresponding step may be omitted.

For example, the configuration information may include configuration information related to MTRP transmission described in the above-described proposed methods (e.g., Embodiment 1/Embodiment 1-1/Embodiment 1-2/Embodiment 2/Embodiment 3, etc.). For example, the configuration information may include configuration information for CORESET/CORESET group (or pool) related to the base station/TCI state related configuration information associated with each TRP (or spatial relationship information associated with each TRP), etc.

For example, the configuration information may include SRS resource-related configuration (e.g., SRS resource set/SRS resource/SRS resource type/related CSI-RS, etc.)/a usage related to an SRS resource (e.g., codebook based/non-codebook based/antenna switching/beam management, etc.)/configuration for uplink channel transmission (e.g., configuration for a PUSCH serving cell (PUSCH-serving-cellconfig)/configuration related to the maximum number of MIMO layers (maxMIMO-layer), etc.)/codebook subset (codebooksubset)/maximum rank (maxrank), etc. described in the above-described proposed methods (e.g., Embodiment 1/Embodiment 1-1/Embodiment 1-2/Embodiment 2/Embodiment 3, etc.).

In addition, the configuration information may include multiple uplink TCI states (i.e., information on multiple reference signals having a QCL relationship with a DMRS of a PUSCH) or multiple spatial relation information (i.e., information on multiple spatial relation reference signals) for uplink (i.e., PUSCH) transmission to multiple TRPs. PUSCH transmission to each TRP may correspond to each TCI state or each spatial relationship information. That is, in the case of two TRP transmissions, a terminal may transmit a PUSCH at a first transmission time occasion(s) (TO) (i.e., a TO group including one or more TOs) among a plurality of total transmission time occasions (TOs) based on a first TCI state or a first spatial relation information, and the terminal may transmit a PUSCH at a second transmission time occasion(s) (TO) (i.e., a TO group including one or more TOs) among a plurality of total transmission time occasions (TOs) based on a second TCI state or a second spatial relation information.

A base station may transmit DCI for scheduling a PUSCH to a terminal (S1002). The DCI may be transmitted through a control channel (e.g., PDCCH, etc.).

Here, the DCI may include (indication) information on a TCI state (e.g., TCI field)/resource allocation information on the TCI state (e.g., bandwidth)/resource allocation information (i.e., spatial/frequency/time resource) on a data channel (e.g., PDSCH/PUSCH), etc.

For example, as described in the above proposed methods (e.g., Embodiment 1/Embodiment 1-1/Embodiment 1-2/Embodiment 2/Embodiment 3, etc.), the DCI may include an SRI field/a precoding information and number of layers field (or TPMI field).

A terminal may determine a PUSCH transmission precoder based on an SRS resource indicator (SRI), a transmission precoding matrix indicator (TPMI), and a transmission rank. Here, an SRI, a TPMI, and a transmission rank may be given by an SRS resource indicator field and a precoding information and number of layers field in DCI, respectively.

In addition, one of 2 (or 4) SRS resources defined in one SRS resource set is indicated through a 1 (or 2) bit SRI field of DCI. Although not shown in FIG. 10, before a PDCCH carrying DCI of a terminal, the terminal may transmit an SRS to a network. In addition, an SRI indicated in slot n by DCI is related to the most recent transmission of an SRS resource identified by the SRI (i.e., the most recent prior to a PDCCH carrying the corresponding DCI).

In this way, a terminal may apply a specific precoding matrix indicated from a predetermined codebook according to a TPMI and a transmission rank (i.e., given by a Precoding information and number of layers field) given by DCI to an antenna port of an SRS resource selected (indicated) by an SRI field in DCI and transmit a PUSCH to a network.

For example, a precoding vector indicated/configured by a TPMI in DCI may be divided into a plurality of groups (e.g., group 0/group 1) based on a predefined rule, and each group may be applied to PUSCH TO of each TRP. For example, the predefined rule may be determined based on a codebook subset configuration (e.g., partial coherent/non-coherent, etc.). The predefined rule may be based on the methods described in Embodiment 1/Embodiment 1-1/Embodiment 1-2 described above.

A base station receives a PUSCH from a terminal (S1003).

Here, the PUSCH may be transmitted by applying a rank/precoder (or beam) based on information configured based on the above-described proposed methods (e.g., Embodiment 1/Embodiment 1-1/Embodiment 1-2/Embodiment 2/Embodiment 3, etc.).

A PUSCH may be transmitted on a plurality of transmission occasions (TOs). Here, a plurality of transmission occasions can be divided into N TO groups (i.e., each TO group includes one or more TOs) corresponding to each TRP, and different uplink TCI states or spatial relationship information may be used for PUSCH transmission for each TO group.

Also, according to the above-described proposed methods (e.g., Embodiment 1/Embodiment 1-1/Embodiment 1-2/Embodiment 2/Embodiment 3, etc.), a PUSCH transmitted in each TO group may be transmitted based on a precoding vector group associated with a TO group in which the PUSCH is transmitted.

Here, a precoding vector group may be determined as one or more precoding vectors (i.e., column vectors and/or row vectors) constituting a precoding matrix determined according to a TPMI and/or a transmission rank.

Here, a precoding vector group may be determined as one or more precoding vectors among precoding vectors for each layer constituting the precoding matrix. For example, in the case of PUSCH transmission of rank 4 toward 2 TRP, a precoding vector group applied to a PUSCH (transmission to a first TRP or transmission according to a first UL TCI state or transmission according to first spatial relationship information) transmitted in a first TO group is determined as the first column vector (i.e., a column vector for the first layer) and the second column vector (i.e., a column vector for the second layer). Similarly, a precoding vector group applied to a PUSCH (transmission to a second TRP or transmission according to a second UL TCI state or transmission according to second spatial relationship information) transmitted in a second TO group is determined as the third column vector (i.e., a column vector for the third layer) and the fourth column vector (i.e., a column vector for the fourth layer).

In addition, for example, a first precoding vector group applied to a PUSCH (transmission to a first TRP or transmission according to a first UL TCI state or transmission according to a first spatial relation information) transmitted in a first TO group may be determined as a precoding vector for the ceil(transmission rank indicated by DCI/2)th layer (ceil(x) is the smallest integer not less than x) from a precoding vector for the first layer. In addition, a second precoding vector group applied to a PUSCH (transmission to a second TRP or transmission according to a second UL TCI state or transmission according to a second spatial relation information) transmitted in a second TO group may be determined as precoding vectors for the remaining layers.

In addition, a precoding vector group may be determined as one or more precoding vectors in which an element for a predetermined antenna port has a non-zero value among precoding vectors for each layer constituting the precoding matrix. For example, in the case of 4Tx PUSCH transmission toward 2 TRPs, a precoding vector group applied to a PUSCH (transmission to a first TRP or transmission according to a first UL TCI state or transmission according to a first spatial relation information) transmitted in a first TO group is composed of column vectors having non-zero values in the first and third row elements (i.e., elements for the first and third antenna ports). Similarly, a precoding vector group applied to a PUSCH (transmission to a second TRP or transmission according to a second UL TCI state or transmission according to a second spatial relation information) transmitted in a second TO group may be composed of column vectors having non-zero values in the second and fourth row elements (i.e., elements for the second and fourth antenna ports).

In addition, a precoding vector group may be determined as precoding vectors for all layers in a precoding matrix in which elements for some antenna ports in the precoding matrix are reset to 0. For example, in the case of 4Tx PUSCH transmission toward 2 TRPs, the first precoding vector group applied to a PUSCH (transmission to a first TRP or transmission according to a first UL TCI state or transmission according to a first spatial relation information) transmitted in a first TO group may be composed of all column vectors (i.e., precoding vectors for all layers) in a precoding vector in which the first and second row elements (i.e. elements for the first and second antenna ports) in a precoding matrix indicated by DCI are reset to 0. In addition, a second precoding vector group applied to a PUSCH (transmission to a second TRP or transmission according to a second UL TCI state or transmission according to a second spatial relation information) transmitted in a second TO group may be composed of all column vectors (i.e., precoding vectors for all layers) in a precoding vector in which the third and fourth row elements (i.e. elements for the third and fourth antenna ports) in a precoding matrix indicated by DCI are reset to 0.

In addition, when a transmission rank for a PUSCH is 2, a precoding vector group may be determined as a precoding vector for the first layer in which elements for some antenna ports and a precoding vector for the second layer in which elements for the remaining antenna ports are reset to 0 in the precoding matrix. That is, elements reset to 0 for each layer may not overlap. For example, a precoding vector group applied to a PUSCH (transmission to a second TRP or transmission according to a second UL TCI state or transmission according to a second spatial relation information) transmitted to a specific TO group may be composed of a first column vector (i.e., a precoding vector for the first layer) in which the first and second row elements (i.e., row elements for the first and second antenna ports) are reset to 0, and a second column vector (i.e., a precoding vector for the second layer) in which the third and fourth row elements (i.e., row elements for the third and fourth antenna ports) are reset to 0.

In addition, in each TO, the PUSCH may be transmitted based on a precoding vector for a single layer in a precoding vector group associated with a TO group in which the PUSCH is transmitted. Here, the precoding vector for a single layer for each TO in which the PUSCH is transmitted within the TO group may be sequentially and circularly applied within the precoding vector group. For example, a PUSCH may be transmitted in a single layer by dividing two or more rank I precoder into precoders for each layer and sequentially applying them to PUSCH TO. As another example, in the case of PUSCH transmission toward 2 TRPs, the first precoding vector group applied to a PUSCH (transmission to a first TRP or transmission according to a first UL TCI state or transmission according to a first spatial relation information) transmitted in a first TO group may be composed of the first and second column vectors (i.e., precoding vectors for the first and second layers) in a precoding matrix indicated by DCI. Here, first and second column vectors may be alternately applied, for each TO, to a PUSCH transmitted in a first TO group. In addition, the second precoding vector group applied to a PUSCH (transmission to a second TRP or transmission according to a second UL TCI state or transmission according to a second spatial relation information) transmitted in a second TO group may be composed of the third and fourth column vectors (i.e., precoding vectors for the third and fourth layers) in a precoding matrix indicated by DCI. Here, third and fourth column vectors may be alternately applied, for each TO, to a PUSCH transmitted in a second TO group.

In addition, power for all antenna ports of the precoding matrix may be equally distributed to antenna ports corresponding to non-zero elements in the precoding vector group for power control of the PUSCH. For example, a terminal may transmit the PUSCH by distributing power for each port/rank based on the method of Embodiment 3 described above.

General Device to which the Present Disclosure May be Applied

FIG. 12 is a diagram which illustrates a block diagram of a wireless communication device according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs(Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN(Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN(personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
receiving, by a terminal, from a base station, downlink control information for scheduling a physical uplink channel; and
transmitting, to the base station, the physical uplink channel based on information for a transmission precoding matrix and information for a transmission rank in the downlink control information,
wherein the physical uplink channel is transmitted in a plurality of transmission occasions (TOs),
wherein the plurality of TOs are divided into N (N is an integer greater than 0) TO groups including one or more TOs,
wherein the physical uplink channel is transmitted based on a precoding vector group related to a TO group in which the physical uplink channel is transmitted,
wherein a precoding matrix determined based on the downlink control information comprises a plurality of column vectors, and
wherein the precoding vector group is determined as one or more column vectors from the plurality of column vectors.

2. The method of claim 1, wherein a first precoding vector group applied to a physical uplink channel transmitted in a first TO group is determined as column vectors for the ceil(the transmission rank/2)th layer from a precoding vector for a first layer,
wherein a second precoding vector group applied to a physical uplink channel transmitted in a second TO group is determined as column vectors for the remaining layers,
wherein ceil(x) is the smallest integer not less than x.

3. The method of claim 1, wherein the precoding vector group is determined as one or more column vectors comprising a non-zero element for a specific antenna port from the plurality of column vectors.

4. The method of claim 1, wherein the precoding vector group is determined as column vectors for all layers in a precoding matrix in which elements for some antenna ports in the precoding matrix are reset to zero.

5. The method of claim 4, wherein if the transmission rank is 2, the precoding vector group is determined as a column vector for a first layer in which elements for some antenna ports in the precoding matrix are reset to 0 and a column vector for a second layer in which elements of remaining antenna ports are reset to 0.

6. The method of claim 1, wherein in each TO, the physical uplink channel is transmitted based on a column vector for a single layer in a precoding vector group related to a TO group in which the physical uplink channel is transmitted.

7. The method of claim 6, wherein the precoding vector for the single layer for each TO in which the physical uplink channel is transmitted in the TO group is sequentially and circularly applied in the precoding vector group.

8. The method of claim 1, wherein for power control of the physical uplink channel, power for all antenna ports of the precoding matrix is equally distributed to antenna ports corresponding to non-zero elements in the precoding vector group.

9. The method of claim 1, wherein in each of the N TO groups, the physical uplink channel is transmitted based on different transmission configuration indication states or spatial relation information.

10. A terminal comprising:
at least one transceiver for transmitting and receiving a wireless signal; and
at least one processor for controlling the at least one transceiver,
wherein the at least one processor configured to:
receive, from a base station, downlink control information for scheduling a physical uplink channel; and
transmit, to the base station, the physical uplink channel based on information for a transmission precoding matrix and information for a transmission rank in the downlink control information,
wherein the physical uplink channel is transmitted in a plurality of transmission occasions (TOs),
wherein the plurality of TOs are divided into N (N is an integer greater than 0) TO groups including one or more TOs,
wherein the physical uplink channel is transmitted based on a precoding vector group related to a TO group in which the physical uplink channel is transmitted,
wherein a precoding matrix determined based on the downlink control information comprises a plurality of column vectors, and
wherein the precoding vector group is determined as one or more column vectors from the plurality of column vectors.

11. A base station comprising:
at least one transceiver for transmitting and receiving a wireless signal; and
at least one processor for controlling the at least one transceiver,
wherein the at least one processor configured to:
transmit, to a terminal, downlink control information for scheduling a physical uplink channel; and
receive, from the terminal, the physical uplink channel based on information for a transmission precoding matrix and information for a transmission rank in the downlink control information,
wherein the physical uplink channel is transmitted in a plurality of transmission occasions (TOs),
wherein the plurality of TOs are divided into N (N is an integer greater than 0) TO groups including one or more TOs,
wherein the physical uplink channel is transmitted based on a precoding vector group related to a TO group in which the physical uplink channel is transmitted,
wherein a precoding matrix determined based on the downlink control information comprises a plurality of column vectors, and
wherein the precoding vector group is determined as one or more column vectors from the plurality of column vectors.

* * * * *